(12) United States Patent
Prikhodko et al.

(10) Patent No.: US 11,965,740 B2
(45) Date of Patent: Apr. 23, 2024

(54) ISOTROPIC ATTENUATED MOTION GYROSCOPE

(71) Applicant: Analog Devices, Inc., Wilmington, MA (US)

(72) Inventors: Igor P. Prikhodko, Buzzards Bay, MA (US); John A. Geen, Tewksbury, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 18/320,725

(22) Filed: May 19, 2023

(65) Prior Publication Data

US 2023/0296379 A1 Sep. 21, 2023

Related U.S. Application Data

(63) Continuation of application No. 17/410,924, filed on Aug. 24, 2021, now Pat. No. 11,698,257, which is a (Continued)

(51) Int. Cl.
*G01C 19/5712* (2012.01)
(52) U.S. Cl.
CPC ................. *G01C 19/5712* (2013.01)
(58) Field of Classification Search
CPC .................................................. G01C 19/5712
See application file for complete search history.

(56) References Cited

U.S. PATENT DOCUMENTS

| 5,016,072 A | 5/1991 | Greiff |
| 5,241,861 A | 9/1993 | Hulsing, II |

(Continued)

FOREIGN PATENT DOCUMENTS

| CN | 104272062 A | 1/2015 |
| CN | 102597699 B | 7/2015 |

(Continued)

OTHER PUBLICATIONS

International Search Report and Written Opinion for International Application No. PCT/US2021/036259, dated Sep. 15, 2021.

(Continued)

*Primary Examiner* — David J Bolduc
(74) *Attorney, Agent, or Firm* — Wolf, Greenfield & Sacks, P.C.

(57) ABSTRACT

According to some aspects, there is provided a microelectromechanical systems (MEMS) device wherein one or more components of the MEMS device exhibit attenuated motion relative to one or more other moving components. The MEMS device may comprise a substrate; a proof mass coupled to the substrate and configured to move along a resonator axis; and a first shuttle coupled to the proof mass and comprising one of a drive structure configured to drive the proof mass along the resonator axis or a sense structure configured to move along a second axis substantially perpendicular to the resonator axis in response to motion of the proof mass along the resonator axis, wherein displacement of at least a first portion of the proof mass is attenuated relative to displacement of the first shuttle and/or a second portion of the proof mass.

20 Claims, 41 Drawing Sheets

Related U.S. Application Data continuation-in-part of application No. 17/409,291, filed on Aug. 23, 2021, now abandoned, and a continuation-in-part of application No. PCT/US2021/047132, filed on Aug. 23, 2021.

(60) Provisional application No. 63/069,685, filed on Aug. 24, 2020.

(56) References Cited

U.S. PATENT DOCUMENTS

| | | |
|---|---|---|
| 5,392,650 A | 2/1995 | O'Brien et al. |
| 5,490,420 A | 2/1996 | Burdess |
| 5,600,064 A | 2/1997 | Ward |
| 5,635,638 A | 6/1997 | Geen |
| 5,869,760 A | 2/1999 | Geen |
| 5,948,981 A | 9/1999 | Woodruff |
| 6,230,563 B1 | 5/2001 | Clark et al. |
| 6,257,059 B1 | 7/2001 | Weinberg et al. |
| 6,296,779 B1 | 10/2001 | Clark et al. |
| 6,370,937 B2 | 4/2002 | Hsu |
| 6,481,285 B1 | 11/2002 | Shkel et al. |
| 6,505,511 B1 | 1/2003 | Geen et al. |
| 6,513,380 B2 | 2/2003 | Reeds, III et al. |
| 6,571,630 B1 | 6/2003 | Weinberg et al. |
| 6,634,231 B2 | 10/2003 | Malametz |
| 6,705,164 B2 | 3/2004 | Willig et al. |
| 6,752,017 B2 | 6/2004 | Willig et al. |
| 6,843,126 B2 | 1/2005 | Hulsing, II |
| 6,843,127 B1 | 1/2005 | Chiou |
| 6,845,668 B2 | 1/2005 | Kim et al. |
| 6,860,151 B2 | 3/2005 | Platt et al. |
| 6,877,374 B2 | 4/2005 | Geen |
| 6,883,361 B2 | 4/2005 | Wyse |
| 7,032,451 B2 | 4/2006 | Geen |
| 7,036,373 B2 | 5/2006 | Johnson et al. |
| 7,204,144 B2 | 4/2007 | Geen |
| 7,222,533 B2 | 5/2007 | Mao et al. |
| 7,227,432 B2 | 6/2007 | Lutz et al. |
| 7,258,011 B2 | 8/2007 | Nasiri et al. |
| 7,268,463 B2 | 9/2007 | Li et al. |
| 7,284,429 B2 | 10/2007 | Chaumet et al. |
| 7,287,428 B2 | 10/2007 | Green |
| 7,313,958 B2 | 1/2008 | Willig et al. |
| 7,347,094 B2 | 3/2008 | Geen et al. |
| 7,421,897 B2 | 9/2008 | Geen et al. |
| 7,675,217 B2 | 3/2010 | Delevoye et al. |
| 8,011,245 B2 | 9/2011 | Yatzenko et al. |
| 8,061,201 B2 | 11/2011 | Ayazi et al. |
| 8,096,181 B2 | 1/2012 | Fukumoto |
| 8,205,498 B2 | 6/2012 | Hsu et al. |
| 8,222,974 B2 | 7/2012 | Lutz et al. |
| 8,266,961 B2 | 9/2012 | Kuang et al. |
| 8,322,213 B2 | 12/2012 | Trusov et al. |
| 8,342,023 B2 | 1/2013 | Geiger |
| 8,354,900 B2 | 1/2013 | Cazzaniga et al. |
| 8,443,667 B2 | 5/2013 | Trusov et al. |
| 8,453,504 B1 | 6/2013 | Mao |
| 8,490,483 B2 | 7/2013 | Wrede et al. |
| 8,497,619 B2 | 7/2013 | Medhat et al. |
| 8,516,886 B2 | 8/2013 | Acar et al. |
| 8,516,889 B2 | 8/2013 | Simoni et al. |
| 8,539,832 B2 | 9/2013 | Potasek et al. |
| 8,549,919 B2 | 10/2013 | Günthner et al. |
| 8,656,776 B2 | 2/2014 | Trusov et al. |
| 8,783,105 B2 | 7/2014 | Kuhlmann et al. |
| 8,794,067 B2 | 8/2014 | Schmid et al. |
| 8,844,357 B2 | 9/2014 | Scheben et al. |
| 8,991,247 B2 | 3/2015 | Trusov et al. |
| 9,021,880 B2 | 5/2015 | Stephanou et al. |
| 9,170,107 B2 | 10/2015 | Anac et al. |
| 9,207,081 B2 | 12/2015 | Geen |
| 9,207,254 B2 | 12/2015 | Simoni et al. |
| 9,212,908 B2 | 12/2015 | Geen et al. |
| 9,217,756 B2 | 12/2015 | Simon et al. |
| 9,246,017 B2 | 1/2016 | van der Heide et al. |
| 9,278,847 B2 * | 3/2016 | Cazzaniga ............ B81B 3/0018 |
| 9,360,319 B2 | 6/2016 | Jia |
| 9,493,340 B2 | 11/2016 | Mahameed et al. |
| 9,599,471 B2 | 3/2017 | Vohra et al. |
| 9,709,595 B2 | 7/2017 | Vohra et al. |
| 9,878,901 B2 | 1/2018 | Geen et al. |
| 10,167,189 B2 | 1/2019 | Zhang et al. |
| 10,168,194 B2 | 1/2019 | Vohra et al. |
| 10,203,352 B2 | 2/2019 | Zhang et al. |
| 10,209,070 B2 | 2/2019 | Geisberger |
| 10,239,746 B2 | 3/2019 | Kuang et al. |
| 10,247,554 B2 | 4/2019 | Senkal et al. |
| 10,317,210 B2 | 6/2019 | Kub et al. |
| 10,330,471 B2 | 6/2019 | Zhang |
| 10,415,968 B2 | 9/2019 | Prikhodko et al. |
| 10,451,454 B2 | 10/2019 | Vohra et al. |
| 10,514,259 B2 | 12/2019 | Jia et al. |
| 10,585,111 B2 | 3/2020 | Zhang et al. |
| 10,611,628 B2 | 4/2020 | Lee et al. |
| 10,627,235 B2 | 4/2020 | Prikhodko et al. |
| 10,655,963 B2 | 5/2020 | Ruohio et al. |
| 10,697,774 B2 | 6/2020 | Prikhodko et al. |
| 10,704,908 B1 | 7/2020 | Coronato et al. |
| 10,732,198 B2 | 8/2020 | Zhang |
| 10,746,548 B2 | 8/2020 | Gregory et al. |
| 10,759,659 B2 | 9/2020 | Zhang et al. |
| 10,816,569 B2 | 10/2020 | Zhang et al. |
| 10,882,735 B2 | 1/2021 | Kuang et al. |
| 11,460,301 B2 | 10/2022 | Geisberger |
| 2001/0042405 A1 | 11/2001 | Hulsing |
| 2002/0022291 A1 | 2/2002 | Ferrari et al. |
| 2002/0170355 A1 | 11/2002 | Malametz |
| 2003/0131664 A1 | 7/2003 | Mochida et al. |
| 2005/0024527 A1 | 2/2005 | Chiou |
| 2005/0092085 A1 | 5/2005 | Chen et al. |
| 2005/0139005 A1 | 6/2005 | Geen |
| 2005/0150296 A1 * | 7/2005 | Painter ............... G01C 19/5719 702/147 |
| 2005/0166675 A1 * | 8/2005 | Hobbs ................ G01C 19/5719 73/504.12 |
| 2005/0284223 A1 | 12/2005 | Karaki et al. |
| 2006/0213265 A1 | 9/2006 | Weber et al. |
| 2007/0062282 A1 | 3/2007 | Akashi et al. |
| 2007/0245826 A1 | 10/2007 | Cardarelli |
| 2008/0238537 A1 | 10/2008 | Belt et al. |
| 2008/0271532 A1 | 11/2008 | Platt et al. |
| 2008/0282833 A1 | 11/2008 | Chaumet |
| 2009/0223277 A1 | 9/2009 | Rudolf et al. |
| 2009/0260436 A1 | 10/2009 | Tochi et al. |
| 2010/0116050 A1 | 5/2010 | Wolfram |
| 2010/0132461 A1 | 6/2010 | Hauer et al. |
| 2010/0206071 A1 * | 8/2010 | Rocznik ............ G01C 19/5726 73/504.12 |
| 2010/0236327 A1 | 9/2010 | Mao |
| 2010/0300201 A1 | 12/2010 | Ge et al. |
| 2010/0313657 A1 | 12/2010 | Trusov et al. |
| 2012/0060604 A1 | 3/2012 | Neul et al. |
| 2012/0125099 A1 | 5/2012 | Scheben et al. |
| 2012/0198934 A1 | 8/2012 | Cardarelli |
| 2012/0210788 A1 | 8/2012 | Günther et al. |
| 2012/0222483 A1 | 9/2012 | Blomqvist et al. |
| 2012/0310067 A1 | 12/2012 | Najafi et al. |
| 2013/0139592 A1 * | 6/2013 | Acar .................. B81C 1/00134 257/415 |
| 2013/0192363 A1 | 8/2013 | Loreck |
| 2013/0269413 A1 | 10/2013 | Tao et al. |
| 2014/0190258 A1 | 7/2014 | Donadel et al. |
| 2014/0192061 A1 | 7/2014 | Payne et al. |
| 2014/0260608 A1 | 9/2014 | Lin et al. |
| 2014/0260610 A1 | 9/2014 | McNeil et al. |
| 2015/0128701 A1 | 5/2015 | Vohra et al. |
| 2015/0226558 A1 | 8/2015 | Seeger et al. |
| 2015/0285633 A1 | 10/2015 | Kamal Said Abdel Aziz et al. |
| 2015/0316378 A1 | 11/2015 | Kergueris et al. |
| 2015/0330783 A1 | 11/2015 | Rocchi et al. |
| 2015/0336790 A1 | 11/2015 | Geen et al. |
| 2016/0025493 A1 | 1/2016 | Stewart |
| 2016/0033274 A1 | 2/2016 | Reinmuth et al. |

(56) References Cited

U.S. PATENT DOCUMENTS

| | | | |
|---|---|---|---|
| 2016/0169931 A1* | 6/2016 | Tocchio | G01P 15/02 |
| | | | 73/514.01 |
| 2016/0231118 A1* | 8/2016 | Trusov | G01C 19/5726 |
| 2016/0264404 A1 | 9/2016 | Acar | |
| 2016/0265916 A1 | 9/2016 | Kergueris et al. | |
| 2016/0316146 A1 | 10/2016 | Kajimura | |
| 2016/0349056 A1 | 12/2016 | Thompson et al. | |
| 2018/0038887 A1 | 2/2018 | Zhang et al. | |
| 2018/0058853 A1 | 3/2018 | Jia et al. | |
| 2018/0172445 A1 | 6/2018 | Prikhodko et al. | |
| 2018/0172446 A1 | 6/2018 | Prikhodko et al. | |
| 2018/0172447 A1 | 6/2018 | Prikhodko et al. | |
| 2018/0216935 A1 | 8/2018 | Senkal et al. | |
| 2018/0299269 A1 | 10/2018 | Anac et al. | |
| 2018/0340775 A1 | 11/2018 | Kuisma | |
| 2019/0033075 A1 | 1/2019 | Wu et al. | |
| 2019/0072389 A1* | 3/2019 | Prati | G01C 19/5712 |
| 2019/0187169 A1 | 6/2019 | Tang et al. | |
| 2019/0310087 A1 | 10/2019 | Gregory et al. | |
| 2019/0383612 A1 | 12/2019 | Geisberger | |
| 2020/0025790 A1 | 1/2020 | Reinke | |
| 2020/0081029 A1 | 3/2020 | Zhang et al. | |
| 2020/0132716 A1 | 4/2020 | Zhang | |
| 2020/0249020 A1 | 8/2020 | Prikhodko et al. | |
| 2020/0263987 A1 | 8/2020 | Blomqvist et al. | |
| 2020/0400434 A1* | 12/2020 | Guerinoni | G01C 19/574 |
| 2020/0408801 A1 | 12/2020 | Vohra et al. | |
| 2021/0381832 A1 | 6/2021 | Prikhodko et al. | |
| 2021/0381833 A1 | 6/2021 | Vohra | |
| 2021/0278847 A1 | 9/2021 | Prikhodko et al. | |
| 2022/0057208 A1 | 2/2022 | Prikhodko et al. | |

FOREIGN PATENT DOCUMENTS

| | | |
|---|---|---|
| CN | 105366627 B | 3/2017 |
| CN | 206321662 U | 7/2017 |
| CN | 107782299 A | 3/2018 |
| CN | 108204806 A | 6/2018 |
| CN | 106932609 B | 5/2019 |
| CN | 209024198 U | 6/2019 |
| CN | 209841242 U | 12/2019 |
| CN | 110902640 A | 3/2020 |
| CN | 111148000 A | 5/2020 |
| JP | 2011-145129 A | 7/2011 |
| JP | 5143267 B2 | 2/2013 |
| JP | 2014-510271 | 4/2014 |
| KR | 2011-0081926 A | 2/2011 |
| KR | 10-1776583 B1 | 9/2017 |
| WO | WO 2009/145967 A1 | 12/2009 |
| WO | WO 2012/120190 A2 | 9/2012 |

OTHER PUBLICATIONS

International Preliminary Report on Patentability dated Dec. 22, 2022 in connection with International Application No. PCT/US2021/036259.

International Search Report and Written Opinion for International Application No. PCT/US2021/036190, dated Sep. 10, 2021.

International Preliminary Report on Patentability dated Dec. 22, 2022 in connection with International Application No. PCT/US2021/036190.

International Search Report and Written Opinion for International Application No. PCT/US2021/47387, dated Nov. 23, 2021.

International Preliminary Report on Patentability dated Mar. 9, 2023 in connection with International Application No. PCT/US2021/047387.

Kranz et al., Micromechanical vibratory rate gyroscopes fabricated in conventional CMOS. Proc. Symposium Gyro Technology. Deutsche Gesellschaft Fuer Ortung Und Navigation, 1997. Stuttgart, Germany. Sep. 16-17; pp. 3.0-3.8.

Kranz, Design, Simulation and Implementation of Two Novel Micromechanical Vibratory-Rate Gyroscopes. Department of Electrical and Computer Engineering. Carnegie Mellon University. May 1988. 41 pages.

Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jmmaa3949bib003.

Li et al., Design and Mechanical Sensitivity Analysis of a MEMS Tuning Fork Gyroscope with an Anchored Leverage Mechanism. Sensors. Aug. 7, 2019; 19:3455.

Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber=6198750.

Liu, Flexure Design for Eight-Bar Rectilinear Motion Mechanism. Thesis submitted in partial satisfaction of the requirements for the degree of Master of Science in Mechanical and Aerospace Engineering. UC Irvine Electronic Theses and Dissertations. 2015; 70 pages.

Miao et al., A novel method of quadrature compensation in the butterfly resonator based on modal stiffness analysis. AIP Advances. Oct. 22, 2018;8(10):105025.

Park et al., Dynamics and control of a MEMS angle measuring gyroscope. Sensors and Actuators A: Physical 144.1 (2008): 56-63.

Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.

Trusov et al., Flat Is Not Dead: Current and Future Performance of Si-MEMS Quad Mass Gyro (QMG) System. 2014 IEEE/ION Position, Location and Navigation Symposium. (PLANS 2014). May 5-8, 2014:252-8.

Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.

Zaman et al., A mode-matched silicon-yaw tuning-fork gyroscope with subdegree-per-hour Allan deviation bias instability. Journal of Microelectromechanical Systems 17.6 (2008): 1526-36.

* cited by examiner

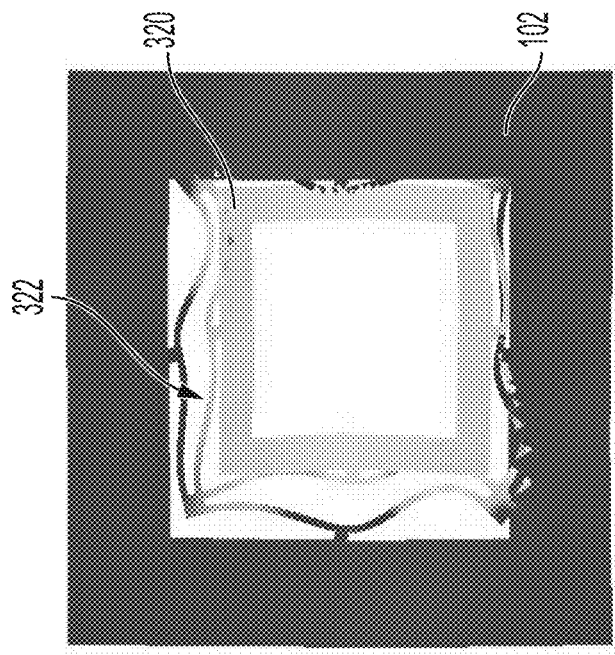
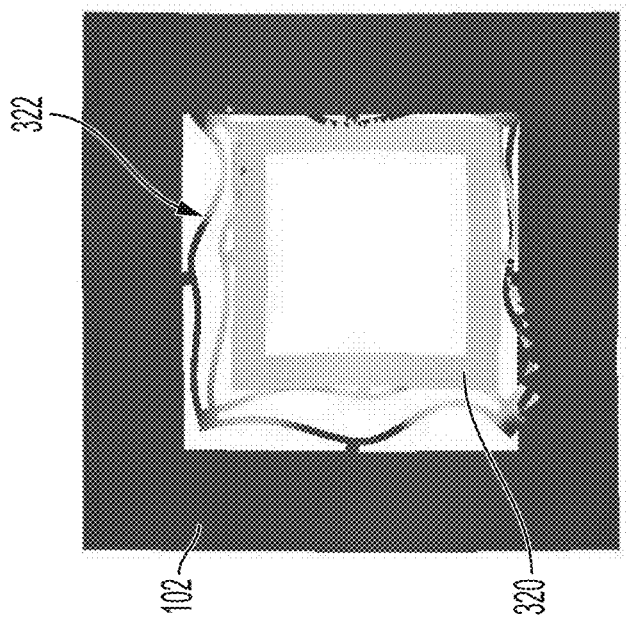
FIG. 3D
FIG. 3C

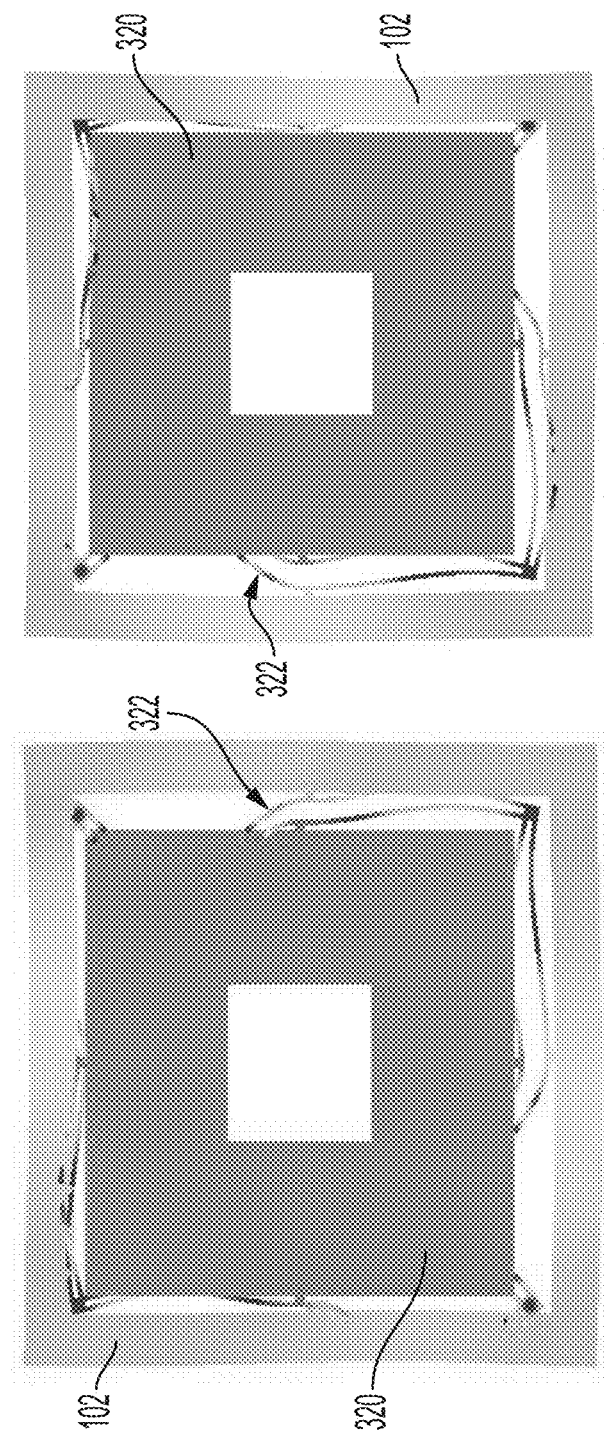

ISOTROPIC ATTENUATED MOTION GYROSCOPE

CROSS-REFERENCE TO RELATED APPLICATIONS

This application claims the benefit under 35 U.S.C. § 120 as a Continuation of U.S. patent application Ser. No. 17/410,924, filed Aug. 24, 2021, and entitled "ISOTROPIC ATTENUATED MOTION GYROSCOPE," which is hereby incorporated herein by reference in its entirety.

U.S. patent application Ser. No. 17/410,924 claims the benefit under 35 U.S.C. § 120 as a Continuation-in-Part of U.S. patent application Ser. No. 17/409,291, filed Aug. 23, 2021, and entitled "ISOTROPIC ATTENUATED MOTION GYROSCOPE," which is hereby incorporated herein by reference in its entirety.

U.S. patent application Ser. No. 17/409,291 claims the benefit under 35 U.S.C. § 119(e) of U.S. Provisional Patent Application Ser. No. 63/069,685, filed Aug. 24, 2020, and entitled "ISOTROPIC ATTENUATED MOTION GYROSCOPE," which is hereby incorporated herein by reference in its entirety.

U.S. patent application Ser. No. 17/410,924 claims the benefit under 35 U.S.C. § 120 as a Continuation-in-Part of PCT Application Serial No. PCT/US2021/047132, filed Aug. 23, 2021, and entitled "ISOTROPIC ATTENUATED MOTION GYROSCOPE," which is hereby incorporated herein by reference in its entirety.

PCT Application No. PCT/US2021/047132 claims the benefit under 35 U.S.C. § 119(e) of U.S. Provisional Patent Application Ser. No. 63/069,685, filed Aug. 24, 2020, and entitled "ISOTROPIC ATTENUATED MOTION GYROSCOPE," which is hereby incorporated herein by reference in its entirety.

U.S. patent application Ser. No. 17/410,924 claims the benefit under 35 U.S.C. § 119(e) of U.S. Provisional Patent Application Ser. No. 63/069,685, filed Aug. 24, 2020, and entitled "ISOTROPIC ATTENUATED MOTION GYROSCOPE," which is hereby incorporated herein by reference in its entirety.

FIELD

The present application relates to mode-matched microelectromechanical systems (MEMS) inertial sensors and related aspects.

BACKGROUND

MEMS devices may comprise multiple moving masses coupled together by one or more couplers. For example, gyroscopes (sometimes referred to simply as "gyros") are devices which are sensitive to rotation, and therefore which can be used to detect rotation. Microelectromechanical systems (MEMS) gyroscopes typically include a movable body, sometimes referred to as a "proof mass," to which an electrical signal is applied to produce motion predominantly along a particular axis. This is referred to as driving the proof mass, and the axis along which the proof mass is driven is sometimes referred to as the drive axis. When the gyroscope experiences rotation, the proof mass additionally moves along an axis different than the drive axis, sometimes referred to as the sense axis. The motion of the proof mass along the sense axis is detected, providing an indication of the rotation experienced by the gyroscope. For some MEMS gyroscopes, driving the proof mass may comprise causing motion of the proof mass in-plane. For some MEMS gyroscopes, rotation may be detected by sensing out-of-plane motion of the proof mass.

SUMMARY

According to some aspects, there is provided a microelectromechanical systems (MEMS) device, comprising: a substrate; a proof mass coupled to the substrate and configured to move along a resonator axis; a first shuttle comprising one of a drive structure or a sense structure, wherein: the drive structure is configured to drive the proof mass along the resonator axis; and the sense structure is configured to move along a second axis substantially perpendicular to the resonator axis in response to motion of the proof mass along the resonator axis; a first lever coupled to the first shuttle at a first end of the first lever and to the proof mass at a second end of the first lever; and an anchor coupled to the substrate, wherein the first lever is coupled to the anchor at a pivot point a first distance away from the first end of the first lever and a second distance away from the second end of the first lever, and wherein the first distance is greater than the second distance such that displacement of the proof mass is attenuated relative to displacement of the first shuttle.

According to some aspects, there is provided a microelectromechanical systems (MEMS) device, comprising: a substrate; a proof mass coupled to the substrate and configured to move along a resonator axis; a drive structure comprising a plurality of electrodes and configured to drive the proof mass along the resonator axis; a second plurality of electrodes disposed in openings of the proof mass; a first lever coupling the drive structure to the proof mass; and an anchor coupled to the substrate, wherein the first lever is coupled to the anchor at a pivot point a first distance away from a first end of the first lever being coupled to the drive structure and a second distance away from a second end of the first lever being coupled to the proof mass, and wherein the first distance is greater than the second distance such that displacement of the proof mass along the resonator axis is attenuated relative to displacement of the drive structure.

According to some aspects, there is provided a gyroscope, comprising: a first proof mass coupled to an underlying substrate and configured to move along a resonator axis; a drive structure comprising a first plurality of electrodes and configured to drive the first proof mass along the resonator axis; a sense structure comprising a second plurality of electrodes and configured to move along a second axis perpendicular to the resonator axis; a first lever coupled to the drive structure at a first end of the first lever and to the first proof mass at a second end of the first lever; and a second lever coupled to the drive structure at a first end of the second lever and to the first proof mass at a second end of the second lever, wherein the first and second levers are coupled to the underlying substrate at respective pivot points, the respective pivot points being disposed closer to the respective second ends of the first and second levers than the respective first ends of the first and second levers, and a frequency of a voltage applied to the first plurality of electrodes is equal to a frequency of a voltage applied to the second plurality of electrodes.

A microelectromechanical systems (MEMS) device, comprising: a substrate; a proof mass coupled to the substrate and configured to move along a resonator axis; and a first shuttle comprising one of a drive structure or a sense structure, wherein: the drive structure is configured to drive the proof mass along the resonator axis; and the sense structure is configured to move along a second axis substantially perpendicular to the resonator axis in response to motion of the proof mass along the resonator axis, wherein: the proof mass is coupled to the first shuttle; and displacement of at least a first portion of the proof mass is attenuated relative to displacement of the first shuttle and/or a second portion of the proof mass.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

FIGS. 3C-3D illustrate motion of the MEMS device of FIG. 1 using the example attenuation mechanism of FIG. 3B, according to some non-limiting embodiments.

FIGS. 3F-3G illustrate motion of the MEMS device of FIG. 1 using the example attenuation mechanism of FIG. 3E, according to some non-limiting embodiments.

DETAILED DESCRIPTION

Introduction

Figure 1:
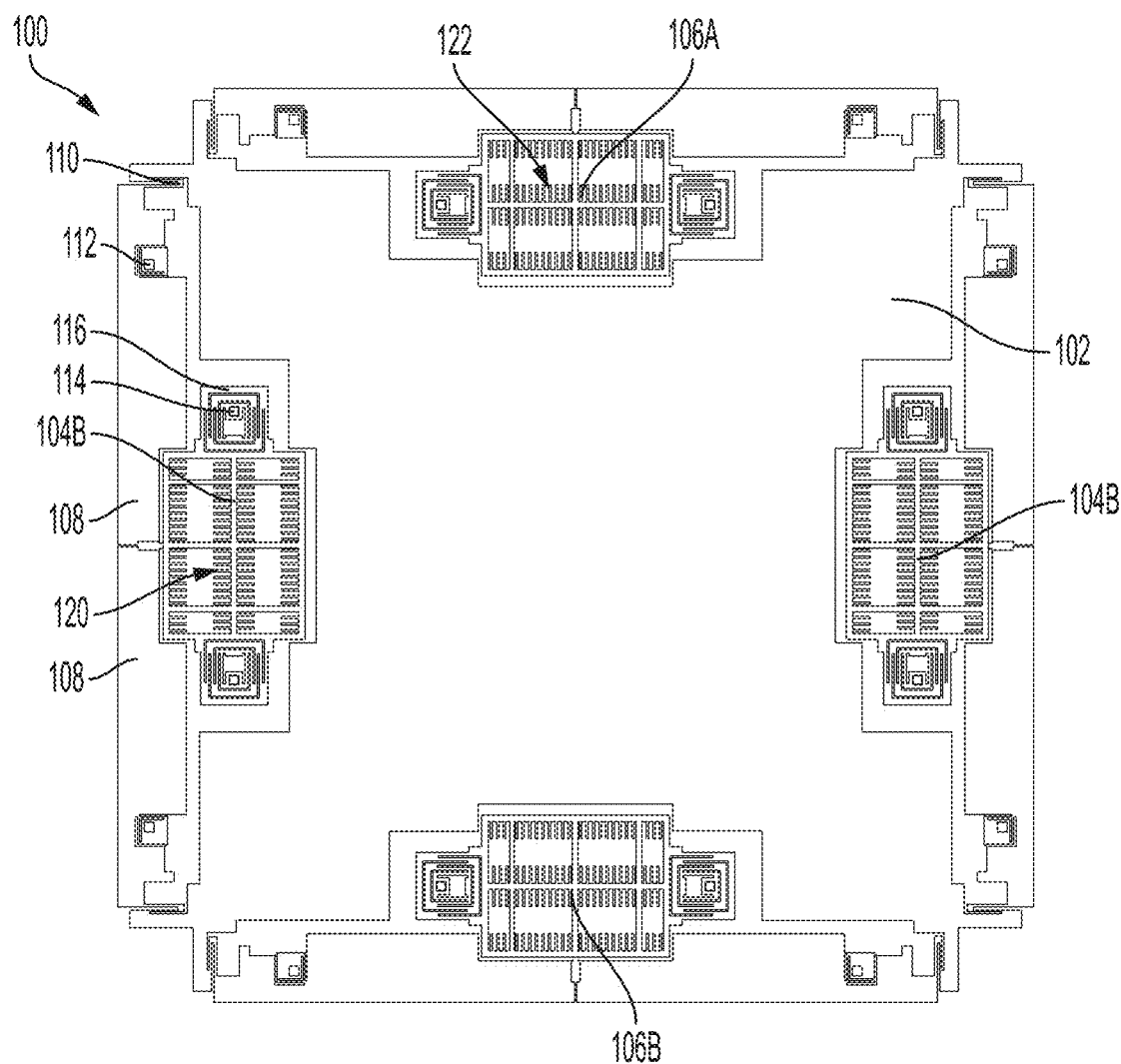
FIG. 1 illustrates an example MEMS device, according to some non-limiting embodiments.

Aspects of the present disclosure provide for microelectromechanical systems (MEMS) devices which exhibit attenuated motion. In particular, there is provided a gyroscope having one or more components (e.g., a proof mass or a portion thereof) that undergo displacement but to a degree relatively less than one or more other components (e.g., one or more shuttles, the proof mass). According to some aspects, motion of a proof mass of the gyroscope is attenuated. According to some aspects, motion of an inner portion of the proof mass is attenuated while motion other portions of the proof mass is not attenuated.

According to further aspects, there is provided a MEMS gyroscope having quadrature trimming electrodes disposed in portions of the MEMS device exhibiting attenuated motion. For example, the quadrature trimming electrodes may be disposed within openings of the proof mass. In some embodiments, the quadrature trimming electrodes may be symmetric and function independently of the direction of drive motion. In particular, the quadrature trimming electrodes operate when the drive motion is along the x-axis as well as when the drive motion is along the y-axis.

According to some aspects, there is provided a MEMS gyroscope configured to enable relatively large motion for driving and sensing, and relatively small motion around quadrature trimming electrodes. For example, in some embodiments, quadrature trim electrodes of the MEMS gyroscope are disposed in a proof mass region of the gyroscope, and drive and sense structures are disposed in a shuttle region of the gyroscope. The proof mass may be coupled to the shuttle with a lever ratio configured to give a greater displacement of the shuttle for a particular displacement of the proof mass. According to further aspects, the attenuated motion gyroscope may be isotropic (e.g., configured such that drive and sense modes of the gyroscope may be switched as desired).

In some embodiments, the gyroscope may be mode-matched. For a mode-matched gyroscope, the frequencies of the drive and sense modes (e.g., frequencies of the voltages applied to drive and sense electrodes) are substantially equal. The frequency of the drive mode may be controlled by controlling the voltage applied to drive electrodes of the drive structure. Frequency tuning electrodes may be implemented along with one or more control loops for actively changing the frequency of the sense mode. The inventors have recognized that configuring a MEMS device having matching drive and sense mode frequencies has advantageous effects on gain and signal-to-noise ratio of a MEMS device. For example, mode matching may increase both gain and signal-to-noise ratio for a MEMS device. In some embodiments, the signal-to-noise ratio of a mode-matched gyroscope is as much as 1,000 times larger than the signal-to-noise ratio of a mode-split MEMS device.

According to some aspects of the technology described herein, the mode-matched gyroscope is implemented without using a ring design. For example, the mode-matched gyroscope may be implemented having a quad mass structure according to in some embodiments. The inventors have recognized that while mode matching is possible for ring-shaped gyroscopes, the amplitude of motion of a ring-shaped gyroscope as well as the gain is relatively small. By contrast, quad mass gyroscopes may achieve larger amplitudes of motion and larger gain.

In some embodiments, the MEMS gyroscope described herein may provide for attenuation of the motion of the proof mass. In some embodiments, the MEMS gyroscope may have increased linearity through the usage of multi-bar pivoting linkages described herein, such that the frequency of the gyroscope motion is independent and unaffected by the amplitude of gyroscope motion. In some embodiments, a nested spring is provided for coupling a shuttle of the gyroscope to an anchor of an underlying substrate, the nested spring providing for improved relief from stress arising due to package deformations.

The aspects and embodiments described above, as well as additional aspects and embodiments, are described further below. These aspects and/or embodiments may be used individually, all together, or in any combination, as the technology is not limited in this respect.

Device Overview

Figure 14:
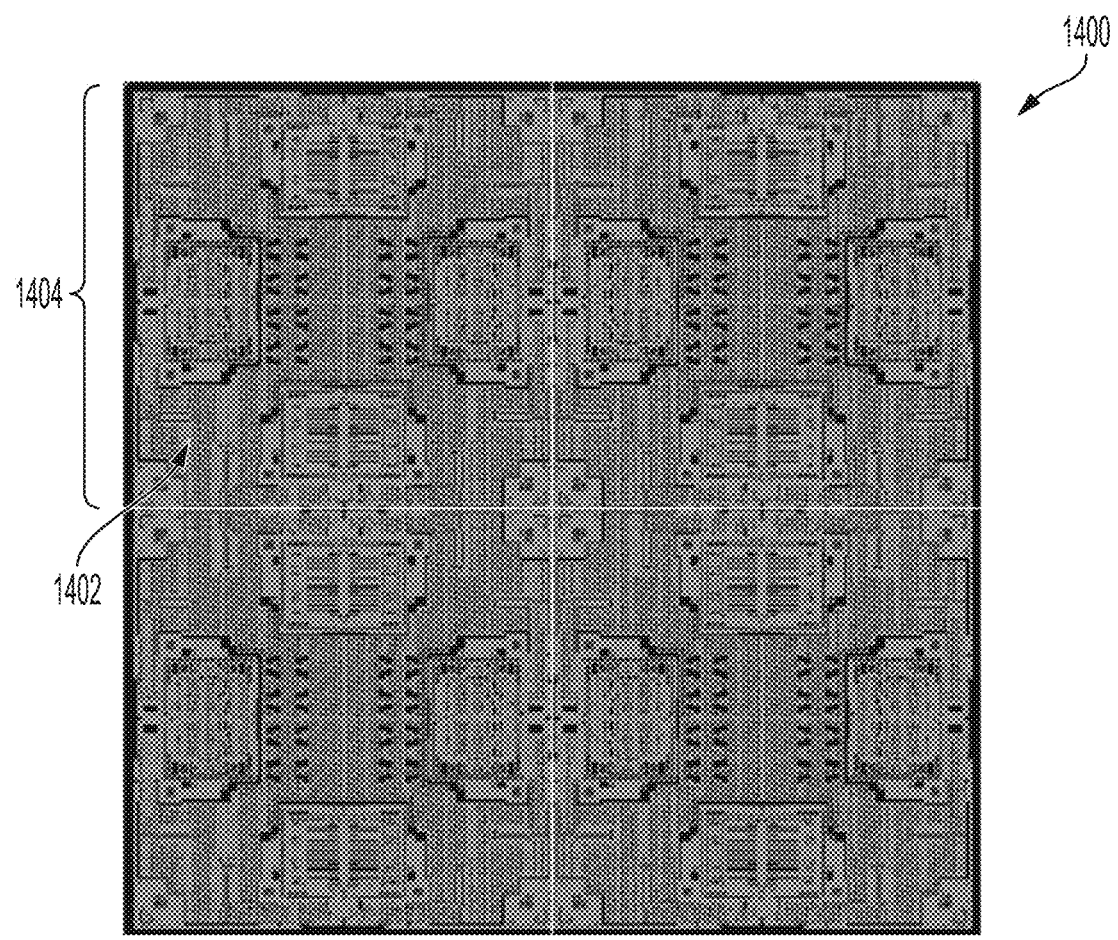
FIG. 14 illustrates an example MEMS gyroscope having four proof masses, according to some non-limiting embodiments.

FIG. 1 illustrates an example MEMS device, according to some non-limiting embodiments. It should be appreciated that aspects of FIG. 1 and some subsequent figures shown herein have been simplified for the purposes of illustration. Additional details of components of the MEMS device 100 are shown in subsequent figures. Further, the MEMS devices described herein may have one or more additional features not shown in the illustrated embodiments. The example MEMS device 100 may comprise a portion of a larger MEMS device, for example, as shown in FIG. 14.

The MEMS device 100 comprises a proof mass 102. The proof mass 102 may be suspended above and coupled to an underlying substrate (not shown). The MEMS device 100 may be configured to detect angular rates through detection of Coriolis forces. For example, the proof mass 102 may be configured to move along a first axis (e.g., a resonator axis and in the illustrated embodiment, the x-axis) and a second axis substantially perpendicular to the first axis (e.g., the y-axis). In some embodiments, the proof mass 102 may be configured to move in-plane and/or out-of-plane.

In particular, FIG. 1 illustrates a MEMS device 100 having a proof mass 102 configured to facilitate detection of angular rates through detection of Coriolis forces. The Coriolis Effect, and hence a Coriolis force, arises when (1) a proof mass oscillates; and (2) the MEMS device is subjected to angular motion. The proof mass may be suspended above an underlying substrate (not shown). In the example shown in FIGS. 1-2, the proof mass 102 may be driven to oscillate along the x-axis, and a Coriolis force arises when the proof mass 102 undergoes angular motion in the plane of the page (e.g., the x-y plane, about an axis through the page). The Coriolis force may cause the proof mass 102 to be displaced along the y-axis. The MEMS device 100 may be configured to sense the displacement of the proof mass 102 to measure rotation. In some embodiments, for example as shown in FIG. 14, one or more additional proof masses may be provided to sense rotation about a same or different axis as proof mass 102.

Although the MEMS device 100 is described herein having a drive mode along the x-axis, some aspects of the technology provide for an isotropic gyroscope. Accordingly, the drive and sense axes may be switched as desired without the need to reconfigure (e.g., move or reposition) components of the MEMS device 100. Thus, in some embodiments, the drive motion may be along the x-axis and sensing may be along the y-axis. In other embodiments, drive motion may be along the y-axis while sensing may be along the x-axis.

MEMS device 100 further comprises drive structures 103 (104A-B) and sense structures 106 (106A-B). A drive structure is a structure configured to cause motion of a proof mass of the MEMS device 100. Drive structures 104A-B may include drive capacitors, in which electrostatic forces are used to cause motion of the proof mass 102. For example, a drive structure 104A, 104B may comprise a first plurality of electrodes 120 being spaced a distance from a second plurality of electrodes which are coupled to the underlying substrate. A voltage may be applied to the second plurality of electrodes causing the distance between the first and second plurality of electrodes to change. The drive structures may therefore oscillate in response to the voltage applied to the second plurality of electrodes by virtue of the change in distance between the first and second plurality of electrodes. Motion of the drive structures 104A, 104B may be transferred to the proof mass 102 as further described herein.

A sense structure is a structure configured to detect motion of a proof mass of the MEMS device 100. For example, sense structures 106A-B may sense motion of the proof mass 102 caused by Coriolis forces arising when the proof mass 102 undergoes angular motion. Motion of the proof mass 102 caused by Coriolis forces may be transferred to the sense structures 106A-B causing the sense structures to oscillate as further described herein. Sense structures 106A-B may include sense capacitors 122, in which electrostatic forces are generated when a distance between electrodes coupled to a sense structure and electrodes coupled to the underlying substrate is changed. The Coriolis translational motion of the proof mass 102 may be determined based on the generated electrostatic Coriolis force due to angular rotation.

In the illustrated embodiments, the proof mass 102 comprises two drive structures 104A-B and two sense structures 106A-B. However, any suitable number of drive structures and sense structures may be implemented and coupled to the proof mass 102.

As described herein, motion may be transferred between a respective drive structure 104A, 104B or sense structure 106A, 106B and the proof mass 102. For example, in a drive mode of operation described further herein, motion of a drive structure 104A, 104B may be transferred to the proof mass 102 causing proof mass 102 to oscillate. In a sense mode of operation, motion of the proof mass 102 arising from Coriolis forces may be transferred to a sense structure 106A, 106B. Such transfer of motion may be facilitated by a coupler between the proof mass 102 and respective drive or sense structures. The coupler may comprise a pair of levers 108. The levers 108 may be coupled together.

Each lever 108 may be coupled to a shuttle (e.g., a drive structure 104A, 104B or a sense structure 106A, 106B) at a first end. Aspects of coupling between levers 108 and a shuttle are further described herein.

Each lever 108 may be coupled to the proof mass 102 at a second end. In some embodiments, the lever may be coupled to the proof mass via a spring 110. In some embodiments, the spring 110 may comprise a folded spring (e.g., a single folded spring, a double folded spring), as described herein.

Each lever 108 may further be coupled to an anchor 112 (e.g., via a spring) coupled to the underlying substrate between the first end and the second end. The lever 108 may be configured to pivot about the point that the lever 108 is coupled to the anchor 112. Positioning of the pivot point at anchor 112 may control the attenuation of the proof mass 102 motion, as is further described herein.

The respective shuttles may be coupled to one or more anchors 114 via a nested spring 116. Further aspects of the nested spring 116 are described herein.

Figure 2:
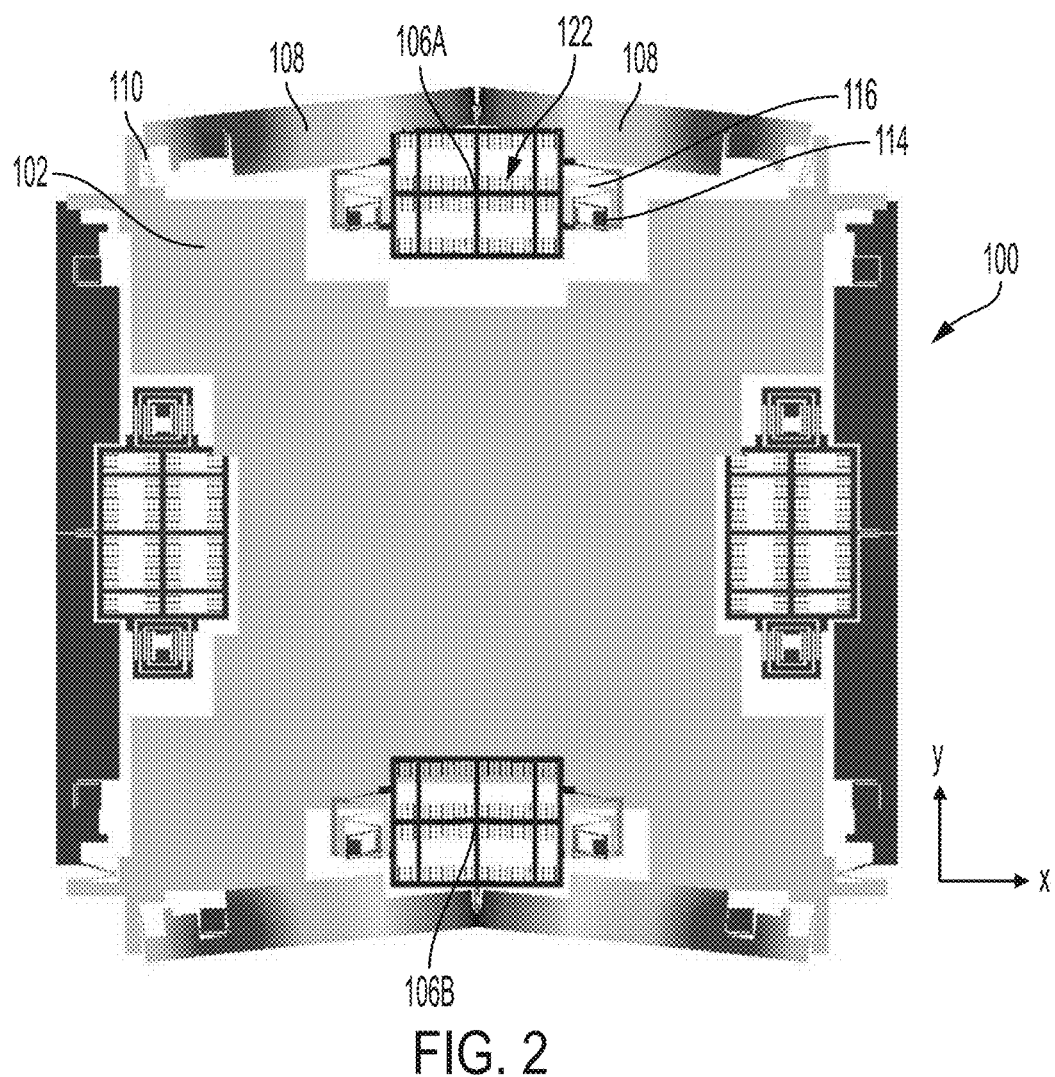
FIG. 2 illustrates motion of the example MEMS device of FIG. 1, according to some non-limiting embodiments.

FIG. 2 illustrates motion of the example MEMS device of FIG. 1, according to some non-limiting embodiments. For simplicity, not all aspects of the MEMS device 100 of FIG. 1 are illustrated in FIG. 2.

FIG. 2 illustrates motion of the example MEMS device 100 of FIG. 1 in a sense mode, according to some non-limiting embodiments. In the illustrated embodiment, the sense mode of the MEMS device 100 comprises motion of the proof mass 102 along the y-axis. As described herein, the MEMS device 100 may be configured to sense the rotation of the proof mass 102 about an out-of-plane axis (e.g., the z-axis) caused by Coriolis forces to detect rotation. In particular, the MEMS device may comprise one or more sense structures 106A, 106B configured to sense motion of the proof mass 102 along the y-axis to measure Coriolis forces acting upon the proof mass 102. In the illustrated embodiment of FIG. 2, the MEMS device comprises two sense structures 106A, 106B coupled to the proof mass 102 and disposed substantially opposite each other.

Motion of the sense structures 106A, 106B may be coupled to the proof mass 102 via levers 108, as described herein. A pair of levers 108 may be coupled to a respective sense structure 106A, 106B. When the proof mass 102 oscillates, the pair of levers 108 may pivot, as shown in FIG. 2. In some embodiments, each of the levers 108 have multiple pivot points.

Although in the illustrated embodiment, the drive and sense modes are along the x- and y-axes, respectively, in other embodiments, drive and sense motion may be along any combination of the x, y, and/or z axes.

Attenuated Motion Aspects

As described herein, some aspects of the technology relate to attenuating displacement of the proof mass relative to displacement of one or more shuttles (e.g., one or more drive structures and/or one or more sense structures). Some aspects relate to attenuating displacement of a portion of the proof mass (e.g., an inner mass) relative to other portions of the proof mass.

The inventors have appreciated that decreasing the gap between electrodes of the gyroscope (e.g., electrodes for performing quadrature trimming and/or frequency tuning) may increase the efficiency of the electrode's performance. As described herein, certain electrodes of the gyroscopes may be disposed inside the proof mass. However, because the motion of the proof mass is typically on the order of 10 microns, the spacing between parallel plates of the electrodes in the proof mass would also need be 10 microns or larger in order to dispose the electrodes in the proof mass while avoiding breakage of the gyroscope. To facilitate configuration of electrodes with smaller spacing (e.g., 2 microns or less), the inventors have recognized that the motion of the proof mass, or a portion thereof, may be attenuated to prevent damage to the gyroscope which may otherwise result from large displacement of the proof mass.

Thus, in some embodiments, motion of the proof mass may be attenuated. For example, the motion of the proof mass may be attenuated such that the proof mass moves relatively less than the motion of the shuttles. In some embodiments, the motion of the proof mass may be attenuated by a factor of five, such that the proof mass motion and the shuttle motion comprise a 1:5 ratio (e.g., the proof mass may move 2 microns while the shuttle moves 10 microns). In some embodiments, the proof mass motion and the shuttle motion comprise a 1:3 ratio. Attenuation of the proof mass may be facilitated through the use of the kinematic pivoting linkages and placement of their respective pivots further described herein, for example, with reference to FIGS. 3A-7

Figure 3A:
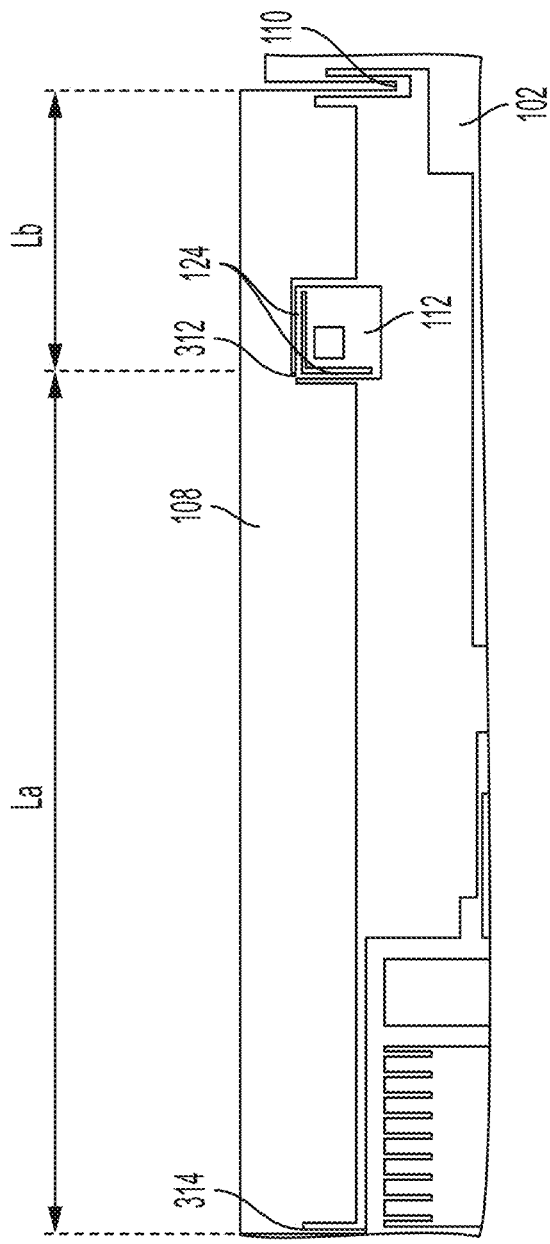
FIG. 3A illustrates relative lengths between portions of the lever of the example MEMS device of FIG. 1, according to some non-limiting embodiments.

To facilitate attenuated motion of the proof mass, the lever may be implemented with an unequal lever arm ratio. FIG. 3A illustrates relative lengths La, Lb between portions of the lever 108 of the example MEMS device 100 of FIG. 1, according to some non-limiting embodiments.

As described herein, the lever 108 may be coupled to anchor 112 at a pivot point 312. That is, the lever 108 is coupled to anchor 112 (e.g., via a spring 124) such that the lever 108 may pivot about pivot point 312. La comprises a portion of the lever 108 between the pivot point 312 and a first end of the lever 108 coupled to the shuttle (partially shown) at point 314. La comprises a portion of the lever 108 between the pivot point 312 and a second end of the lever 108 coupled to the proof mass 102 (e.g., via spring 110).

The ratio of the arm lengths, La/Lb defines the attenuation factor. The arm ratio defines what component of the MEMS device 100 is attenuated. For example, when the distance La is greater than the distance Lb, as shown in the illustrated embodiment, motion of the proof mass 102 is attenuated relative to motion of the shuttle. The arm ratio is defined by location of the pivot point 312 relative to the lever 108. A ratio of 1 means the pivot point 112 is in the middle of the lever 108. The arm ratio larger than 1 means the distance La is greater than the distance Lb and the motion of the proof mass 102 is attenuated relative to motion of the shuttle.

For example, for La=750 µm and Lb=150 µm, the lever arm ratio is La/Lb=5, which means the proof mass 102 moves five times less than the shuttle. If the maximum allowed proof mass 102 amplitude is 2 µm, then the shuttle motion will be amplified by 5 times the displacement of the proof mass 102 (i.e. 10 µm with a lever arm ratio of 5). Any suitable lever arm ratio greater than 1 may be used to attenuate the motion of the proof mass relative to motion of the shuttle (e.g., 2, 3, 4, 5, etc.).

Since the motion is amplified inside the shuttle (e.g., inside a drive structure), less force is required to actuate the motion of the proof mass 102 in a drive mode according to the arm lever law. Accordingly, more efficient use of drive electrodes inside the shuttle area may be achieved with the lever arm ratio illustrated in FIG. 3A and described herein. In the illustrated embodiments, the drive structures and sense structures comprise comb finger electrodes for drive mode actuation and sense mode detection, respectively.

In some embodiments, motion of the proof mass and the shuttle may be substantially equal. For example, configuring pivot points of the linkage towards the center of the linkage will provide a substantially equal ratio between the motion of the shuttle and the motion of the proof mass.

In some embodiments, motion of the shuttle may be attenuated relative to motion of the proof mass. For example, moving the pivot point away from the proof mass and closer to an end of the lever being coupled to the shuttle causes the motion of the proof mass to be amplified and the motion of the shuttle to be attenuated.

As described herein, in some embodiments, motion of a portion of the proof mass 102 may be attenuated. That is, in some embodiments, some portions of the proof mass 102 may experience the substantially the same displacement, or greater displacement, than the shuttle 104 based on positioning of the pivot points on the lever 108. Other portions of the proof mass 102 may exhibit relatively less displacement.

Figure 3B:
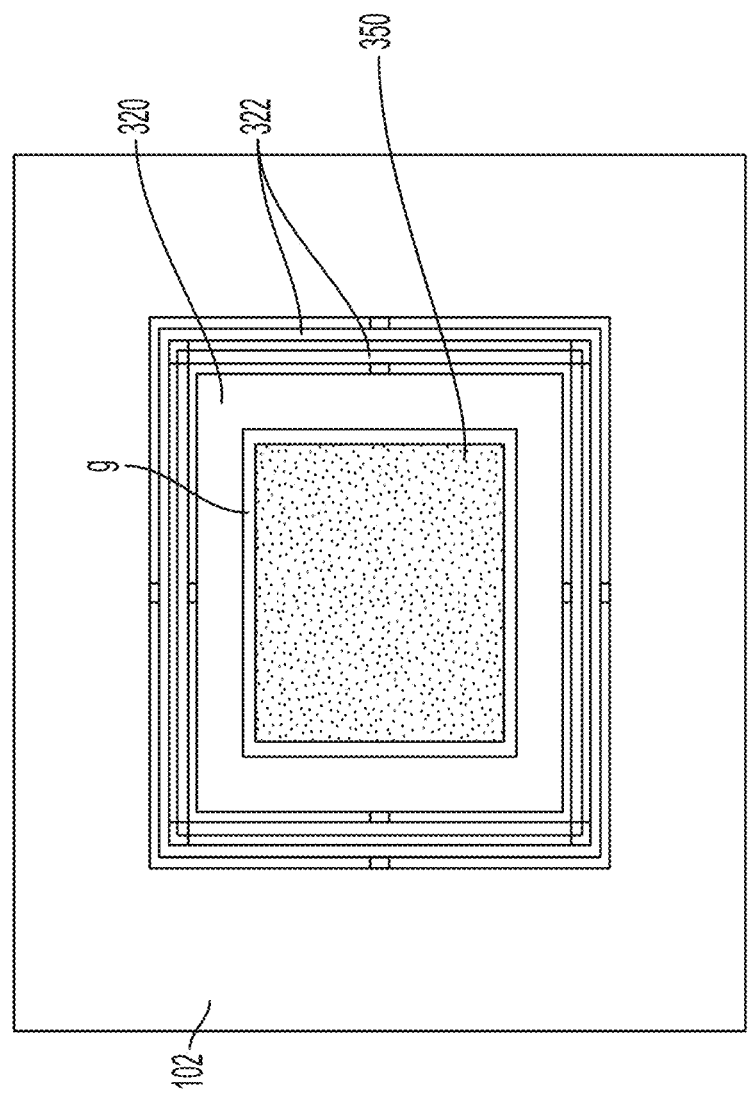
FIG. 3B illustrates another example attenuation mechanism for the example MEMS device of FIG. 1, according to some non-limiting embodiments.

FIG. 3B illustrates another example attenuation mechanism for the example MEMS device of FIG. 1, according to some non-limiting embodiments. As shown in FIG. 3B, an inner mass 320 may be disposed within proof mass 102. The inner mass 320 may be configured, via an attenuation mechanism, to experience a difference amount of displacement than proof mass 102. In the illustrated embodiment of FIG. 3B, the inner mass 320 is configured to exhibit more displacement than proof mass 102 such that motion of the proof mass 102 is attenuated relative to motion of the inner mass 320.

As shown in FIG. 3B, proof mass 120 is coupled to the inner mass 320 via springs 322. At least one electrode 350 may be disposed within a gap g of inner mass 320. As described herein, the at least one electrode 350 may be configured to perform quadrature trimming. Further aspects of the electrode 350 when configured to perform quadrature trimming are described herein.

Attenuation of the proof mass 102 or the inner mass 320 may be accomplished by adjusting the stiffness of the springs 322 relative to the stiffness of springs coupling the proof mass 102 to the substrate (not shown). For example, to attenuate the motion of the proof mass 102 relative to the motion of the inner mass 320, the springs 322 may be relatively stiffer than the springs coupling the proof mass 102 to the underlying substrate.

FIGS. 3C-3D illustrate motion of the MEMS device of FIG. 1 using the example attenuation mechanism of FIG. 3B, according to some non-limiting embodiments. Both the proof mass 102 and the inner mass 320 can move freely in two degrees of freedom. As shown in FIGS. 3C-3D, the relative displacement of the inner mass 320 is larger than the displacement of the proof mass 102 due to the stiffness of springs 322 described herein. In the illustrated embodiment, the inner mass 320 moves four times the amount that the proof mass 102 moves, as one example. Any ratio of displacement between the inner mass 320 and the proof mass 102 may be implemented.

Figure 3E:
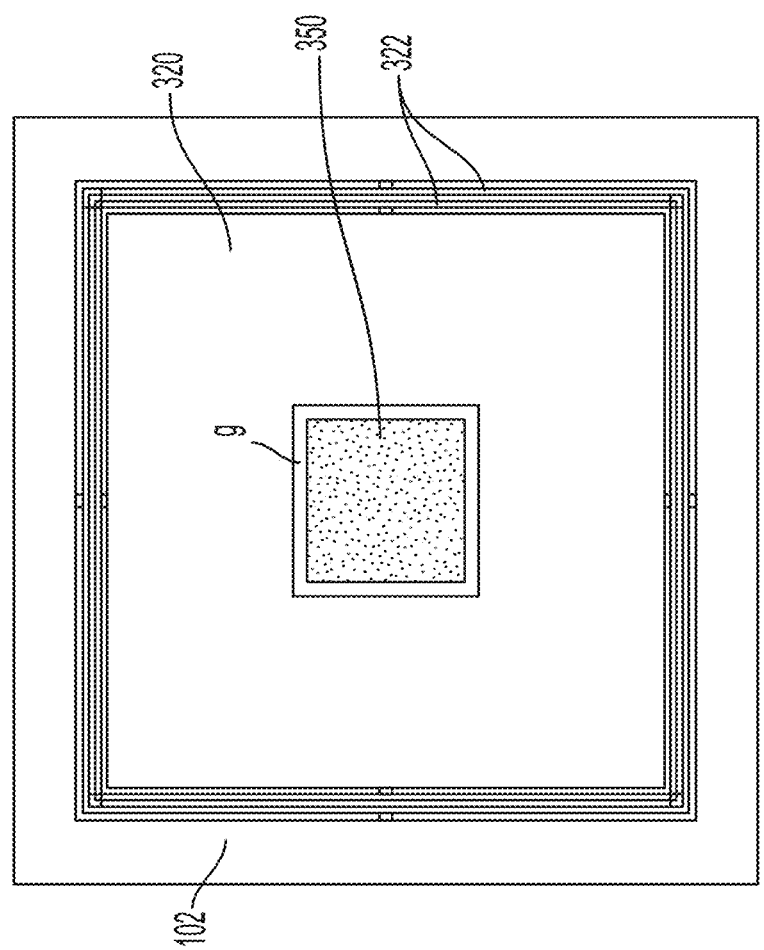
FIG. 3E illustrates another example attenuation mechanism for the example MEMS device of FIG. 1, according to some non-limiting embodiments.

FIG. 3E illustrates another example attenuation mechanism for the example MEMS device of FIG. 1, according to some non-limiting embodiments. In the illustrate embodiment of FIG. 3E, the motion of the inner mass 320 is attenuated relative to the motion of the proof mass 102. Accordingly, the stiffness of the springs 322 may be lesser than the stiffness of the springs coupling the proof mass 102 to the underlying substrate.

Attenuation of the motion of the inner 320 relative to the motion of the proof mass 102 allows for positioning one or more electrodes inside the inner mass while also permitting the one or more electrodes to have a relatively small gap, as described herein. The one or more electrodes may comprise parallel plate electrodes.

In some embodiments, motion of the inner mass 320 may be attenuated relative to the motion of the proof mass 102, as shown in FIG. 3E, and motion of the shuttle 104 may be attenuated relative to motion of the proof mass 102. For example, the pivot point of lever 108 may be positioning closer to an end of the lever 108 being coupled to the shuttle 104 than an end of the lever 108 being coupled to the proof mass 102. High displacement of the proof mass 102 is advantageous for high Coriolis acceleration while the lower displacement of the inner mass 320 and shuttle 104 allows for implementing electrodes with small gaps.

FIGS. 3F-3G illustrate motion of the MEMS device of FIG. 1 using the example attenuation mechanism of FIG. 3E, according to some non-limiting embodiments. Both the proof mass 102 and the inner mass 320 can move freely in two degrees of freedom. As shown in FIGS. 3F-3G, the relative displacement of the inner mass 320 is less than the displacement of the proof mass 102 due to the stiffness of springs 322 described herein. In the illustrated embodiment, the proof mass 102 moves three times the amount that the inner mass 320 moves, as one example. Any ratio of displacement between the inner mass 320 and the proof mass 102 may be implemented.

In some embodiments, motion of the proof mass 102 and the inner mass 320 may be substantially equal. For example, the stiffness of the springs coupling the proof mass 102 to the underlying substrate and the springs 322 may be substantially equal to achieve equal proof mass 102 and inner mass 320 motion.

Figure 3H:
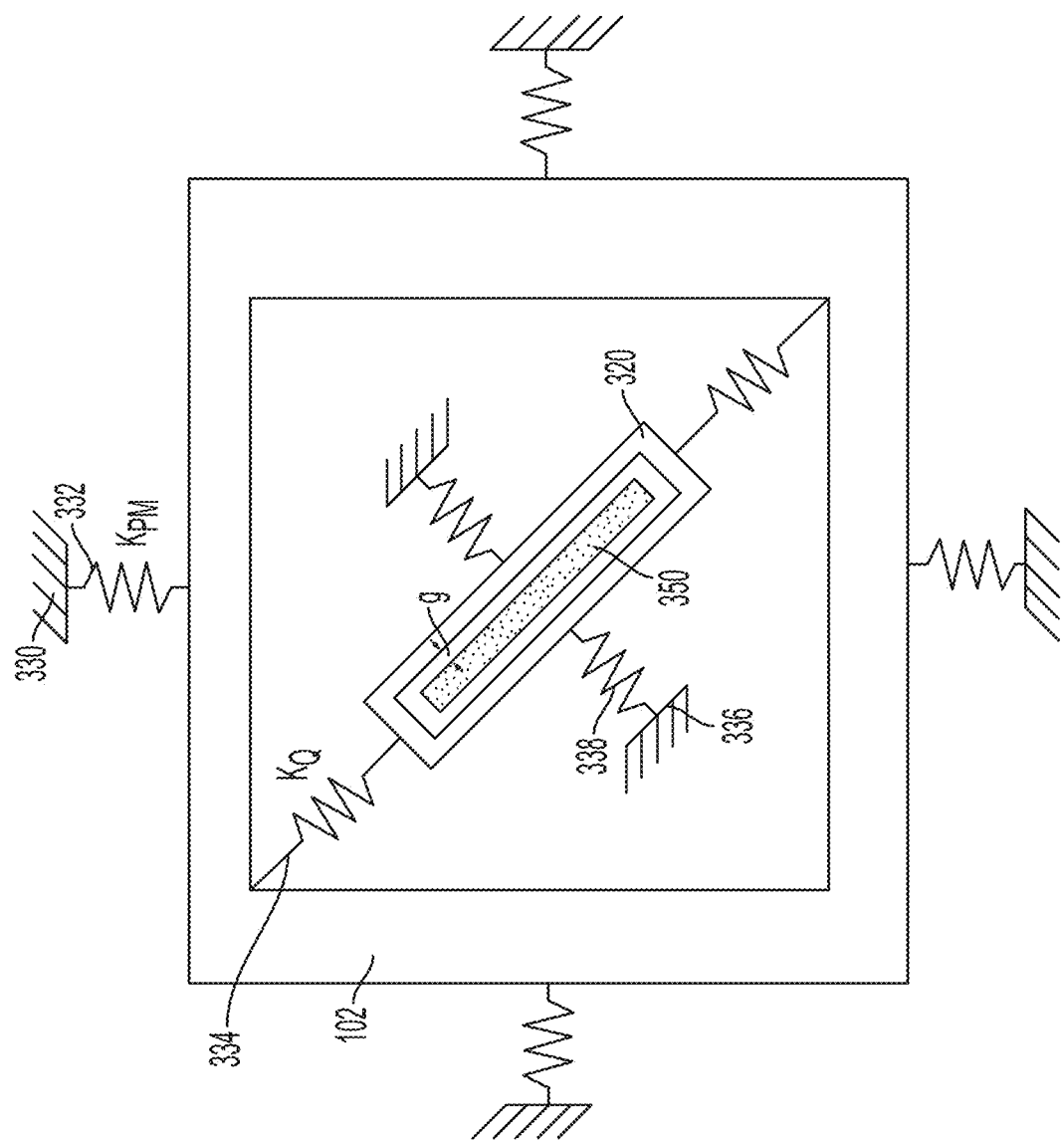
FIG. 3H illustrates another example attenuation mechanism for a MEMS device, according to some non-limiting embodiments.

FIG. 3H illustrates another example attenuation mechanism for a MEMS device, according to some non-limiting embodiments. For example, the MEMS device shown in FIG. 3H may be generally the type shown in FIG. 1 (e.g., having a proof mass 102, levers 108, drive structure 104, and sense structures 106). In the illustrated embodiment of FIG. 3H, the inner mass 320 is restricted to 45 degree motion while the proof mass 102 moves along the x- and y-axes (0 and 90 degree axes).

The illustrated embodiment of FIG. 3H comprises springs 332 coupled to the proof mass 102. The springs 332 are coupled to anchors 330 coupled to the underlying substrate of the MEMS device 100. The stiffness of the proof mass springs 332 is represented by $K_{PM}$.

Springs 338 are coupled to the inner mass 320. The springs 338 are coupled to anchors 336 coupled to the underlying substrate of the MEMS device 100.

The proof mass 120 is coupled to the inner mass 320 via springs 334. The stiffness of the springs 334 coupling the proof mass 102 to the inner mass is represented by $K_Q$.

Motion of the proof mass 102 may be relatively greater, relatively less than, or substantially equal to the motion of the inner mass 320 by adjusting the stiffnesses $K_{PM}$ and $K_Q$. In some embodiments, the stiffness of springs 332 coupled to the proof mass 102, $K_{PM}$, is greater than the stiffness of the springs 334 coupling the proof mass 102 to the inner mass 320, $K_Q$, and the motion of the inner mass 320 is attenuated relative to the motion of the proof mass 102. Where $K_{PM}$ is less than $K_Q$, the motion of the proof mass 102 is attenuated relative to the motion of the inner mass 320. Where $K_{PM}$ is substantially equal to $K_Q$, the motion of the proof mass 102 is substantially equal to the motion of the inner mass 320.

Accordingly, aspects of the technology described herein facilitate attenuation of one or more components of the MEMS device 100 relative to one or more other components of the MEMS device 100.

As shown in FIG. 3H, at least one electrode 350 may be disposed within a gap g of inner mass 320. As described herein, the at least one electrode 350 may be configured to perform quadrature trimming. Further aspects of the electrode 350 when configured to perform quadrature trimming are described herein. In the illustrated embodiment of FIG. 3H, a single electrode 350 is disposed within the gap g of inner mass 320.

Figure 3I:
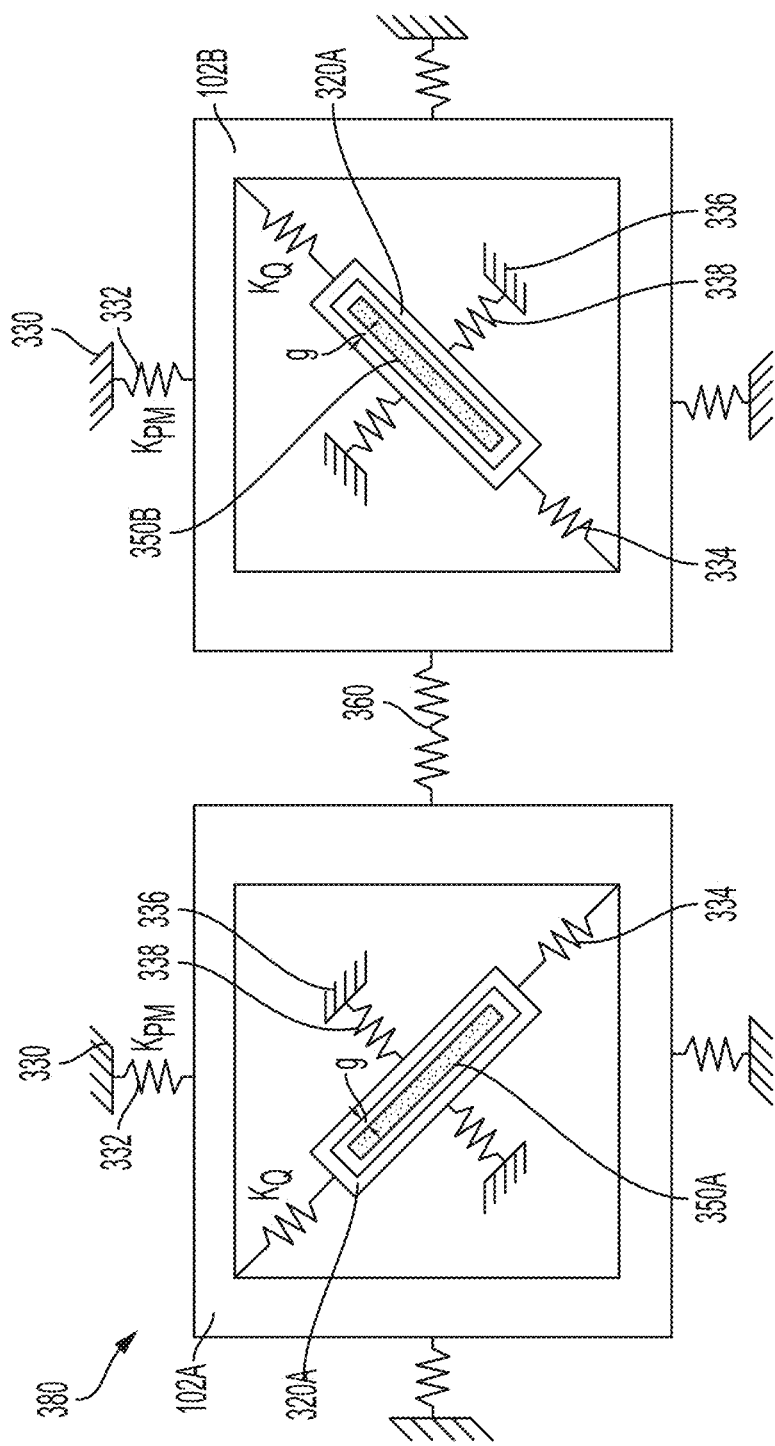
FIG. 3I illustrates the example attenuation mechanism of FIG. 3H in a multi-mass system, according to some non-limiting embodiments.

FIG. 3I illustrates the example attenuation mechanism of FIG. 3H in a multi-mass system (e.g., MEMS device 380), according to some non-limiting embodiments. As shown in FIG. 3H, two proof masses 102A and 102B are coupled together by coupler 360 (e.g., one or more springs). Although in the illustrated embodiment two proof masses are shown being coupled together, the attenuation mechanisms and electrode designs described herein may be implemented in a multi-mass system having any suitable number of proof masses (e.g., at least three proof masses, at least four proof masses, at least six proof masses, at least twelve proof masses, etc.).

Each proof mass 102A, 102B may comprise the components described herein with respect to FIG. 3H. For example, at least one electrode 350 may be disposed within a gap g of the inner mass 320. In the illustrated embodiment of FIG. 3I, each inner mass comprises a single electrode 350 disposed in the respective gaps g. A first electrode 350A is disposed in a gap g of first inner mass 350A and a second electrode 350B is disposed in a gap g of second inner mass 350B. The first and second electrodes 350A, 350B may be of opposite polarities (e.g., one electrode being negative and one electrode being positive). For example, the first electrode 350A may be positive and the second electrode 350B may be negative. As shown in FIG. 3I, the second electrode 350B is rotated 90 degrees relative to the first electrode 350A.

In some embodiments, the proof masses 102A, 102B may be configured to move anti-phase relative to each other. That is, proof mass 102A may be configured to move in an opposite direction along an axis in a drive mode of operation relative to the proof mass 102B. In a sense mode of operation, proof mass 102A may be configured to move in an opposite direction along an axis substantially perpendicular to the drive axis relative to proof mass 102B. The coupler 360 may enforce the anti-phase motion of proof masses 102A and 102B.

Figure 3J:
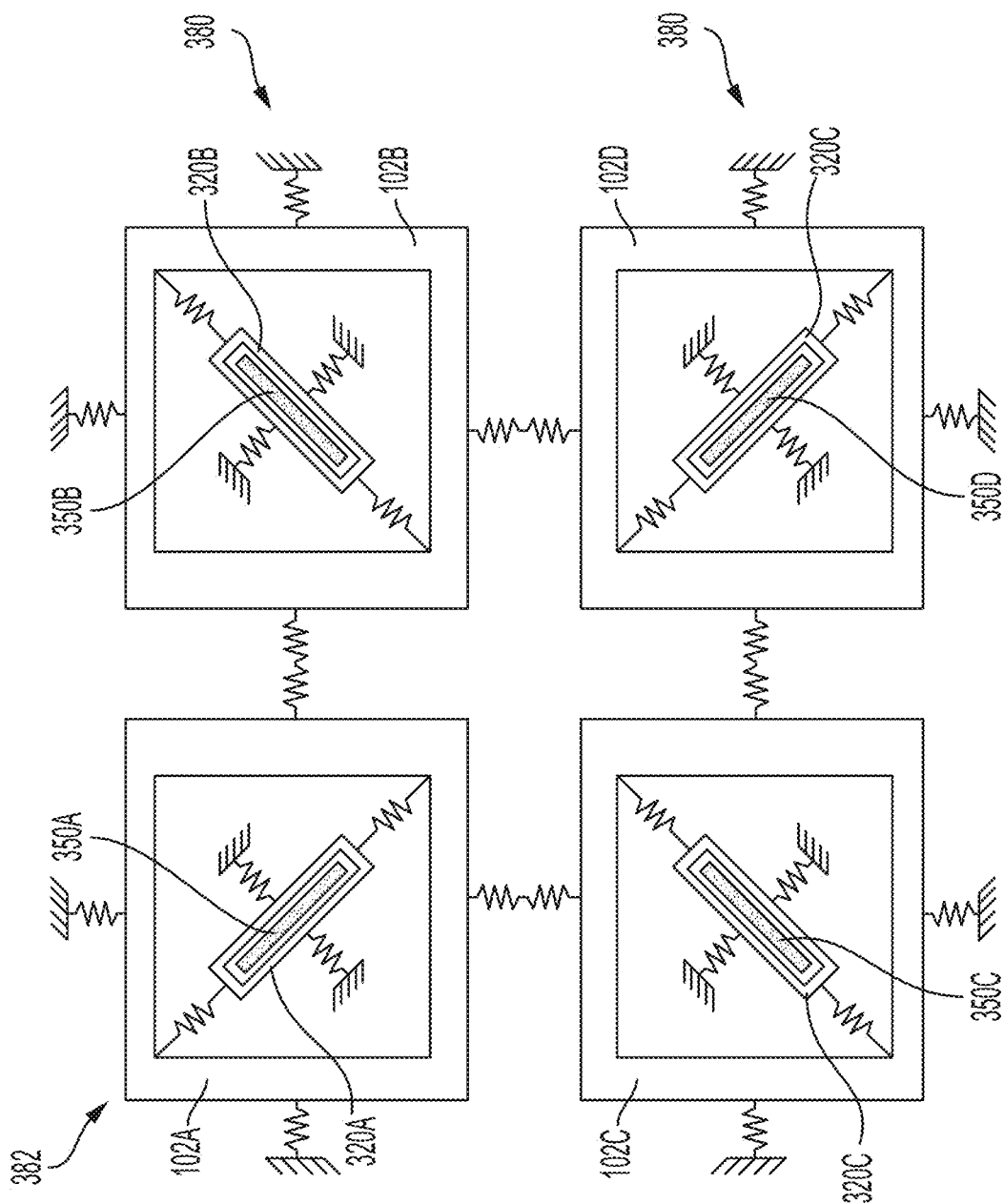
FIG. 3J illustrates multiple instances of the example multi-mass systems of FIG. 3I being coupled together, according to some non-limiting embodiments.

FIG. 3J illustrates multiple instances of the example MEMS devices 380 of FIG. 3I being coupled together, according to some non-limiting embodiments. For example, the MEMS device 382 of FIG. 3J comprises two of the MEMS devices 380 coupled together by couplers 362 (e.g., one or more springs). Accordingly, MEMS device 382 shown in FIG. 3J comprises proof masses 102A-D.

The proof masses 102A-D in the example MEMS device 382 may be configured to move anti-phase relative to an adjacent proof mass. That is, a proof mass 102 may be configured to move in an opposite direction along a first axis in a drive mode relative to the motion of proof masses vertically and horizontally adjacent to the proof mass 102, and in a same direction along the first axis relative to motion of a proof mass diagonally adjacent to the proof mass 102. In a sense mode, the proof mass 102 may be configured to move in an opposite direction along a second axis substantially perpendicular to the first axis relative to motion of the proof masses vertically and horizontally adjacent to the proof mass 102, and in a same direction along the second axis relative to the motion of a proof mass diagonally adjacent to the proof mass 102.

Figure 3K:
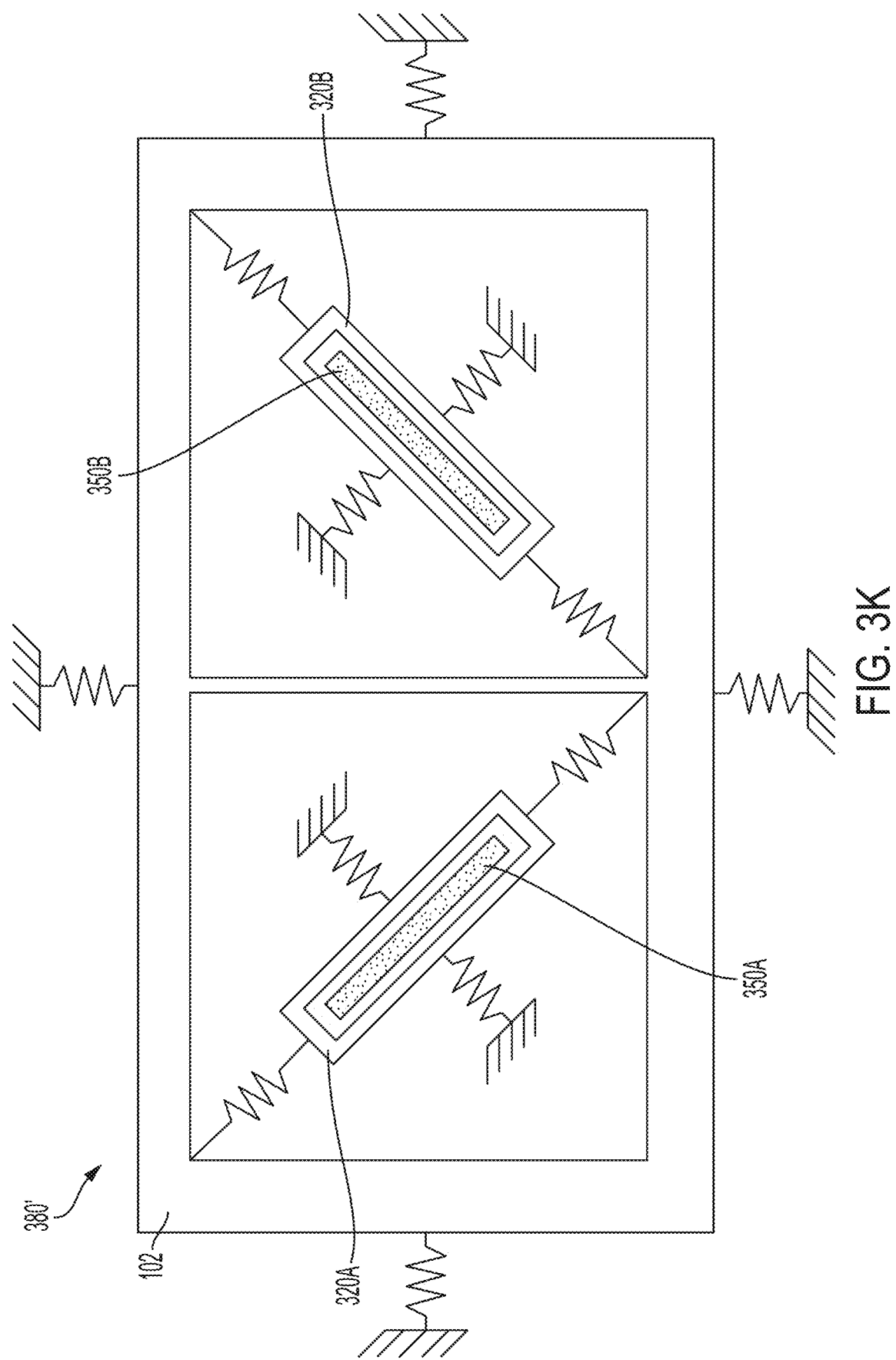
FIG. 3K illustrates an alternative embodiment of the MEMS device of FIG. 3I, according to some non-limiting embodiments.

FIG. 3K illustrates an alternative embodiment of the MEMS device of FIG. 3I, according to some non-limiting embodiments. In the illustrated embodiment of FIG. 3K, MEMS device 380' comprises a single proof mass 102. The single proof mass 102 comprises two inner masses 320A, 320B. A single electrode 350A, 350B in disposed in each respective gap of inner masses 320A, 320B. The respective electrodes 350A, 350B are oriented at 90 degree angles relative to each other.

Figure 3L:
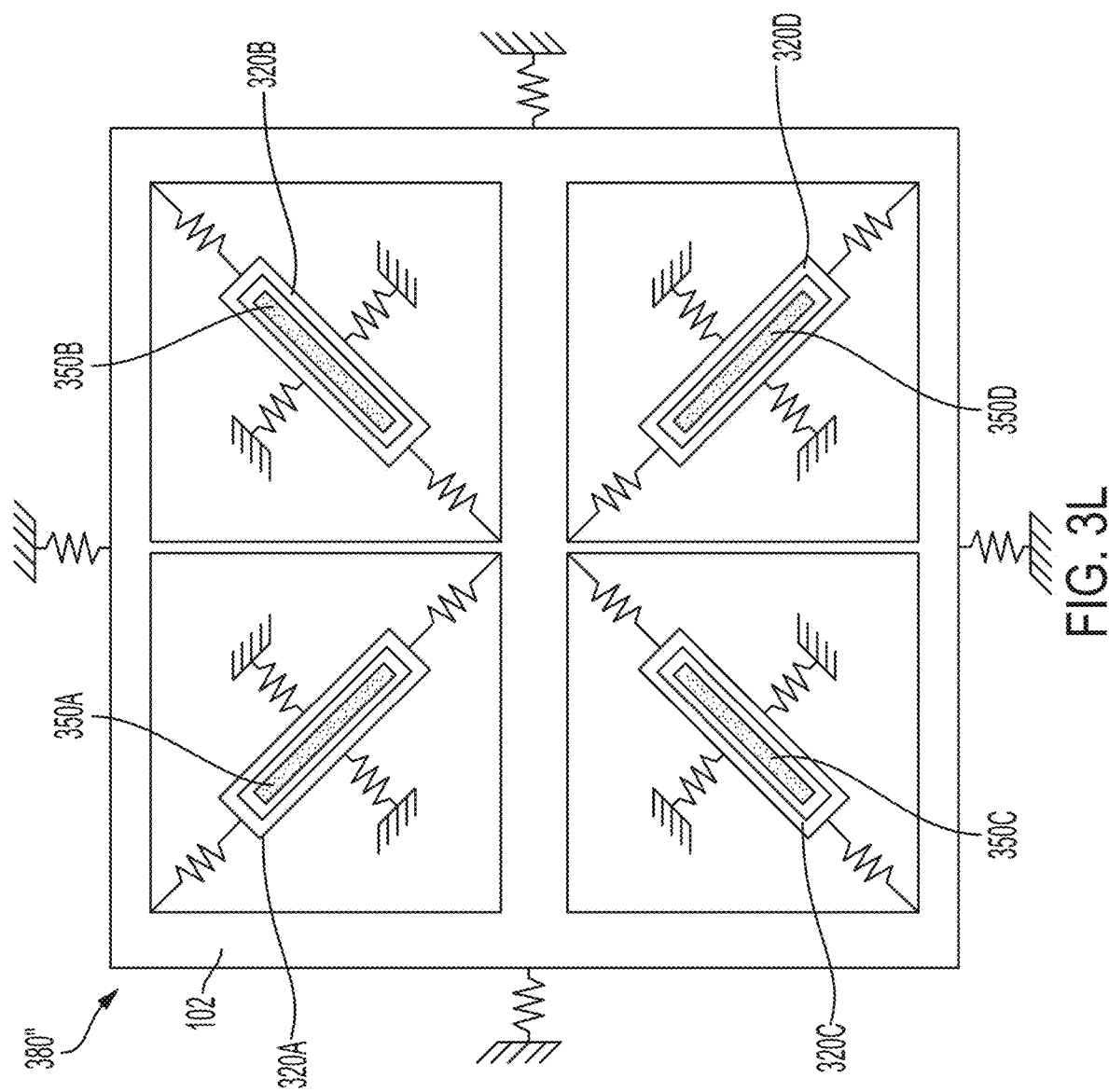
FIG. 3L illustrates the example MEMS device of FIG. 3K having additional electrodes, according to some non-limiting embodiments.

FIG. 3L illustrates the example MEMS device of FIG. 3K having additional electrodes, according to some non-limiting embodiments. In particular, MEMS device 380" shown in FIG. 3L comprises a single proof mass 102 having four inner masses 320A-D. A single electrode 350A-D is disposed in each respective opening of the four inner masses 320A-D. The respective electrodes 350A-D are oriented at 90 degree angles relative to each other. In some embodiments, increasing the number of electrodes disposed in a single proof mass may reduce the effect of fabrication imperfections.

Figure 3M:
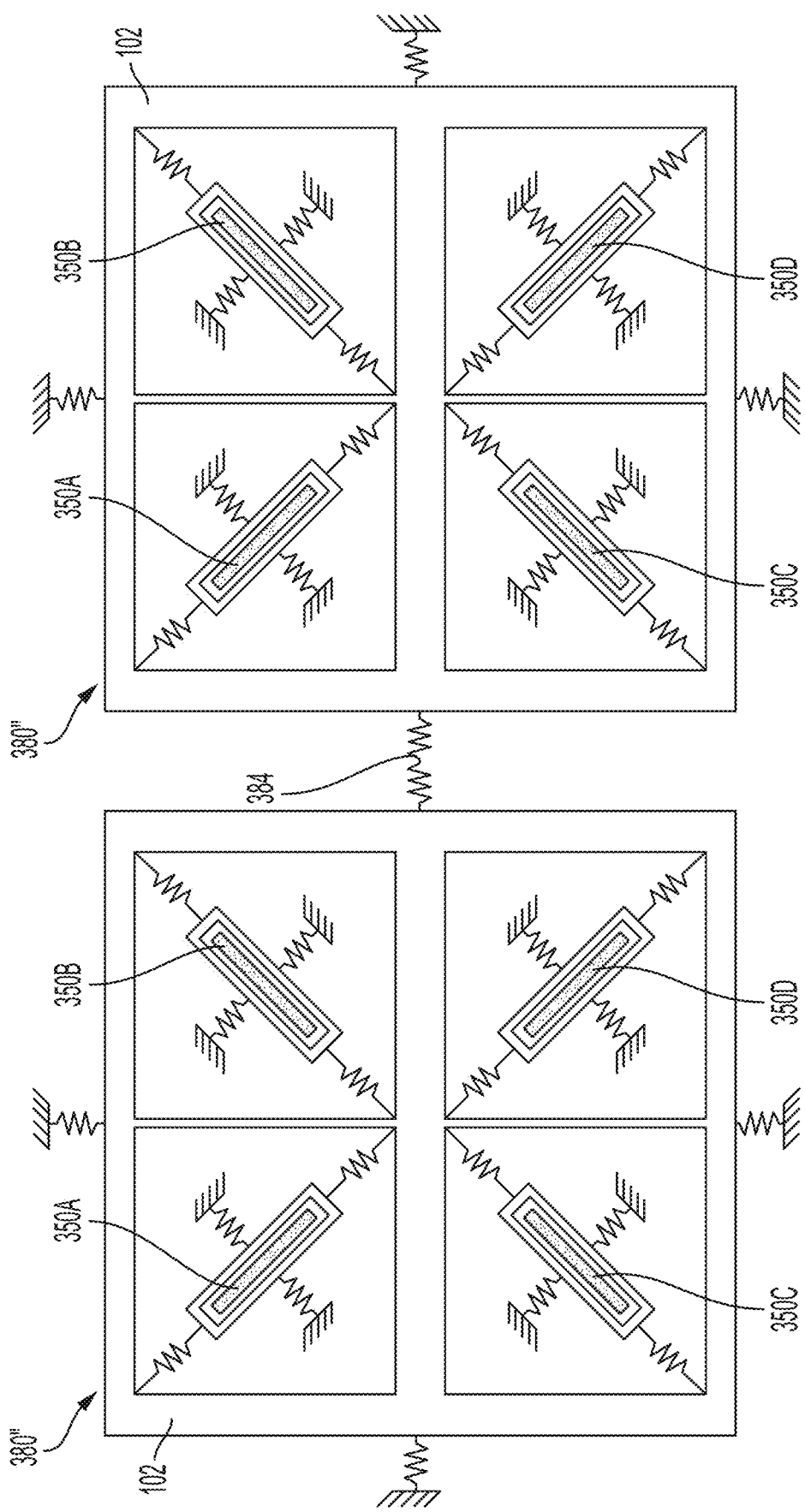
FIG. 3M illustrates multiple of the example MEMS device of FIG. 3L being coupled together, according to some non-limiting embodiments.

FIG. 3M illustrates multiple of the example MEMS device 380" of FIG. 3L being coupled together, according to some non-limiting embodiments. For example, FIG. 3M illustrates two of MEMS device 380" being coupled together by couplers 384 (e.g., one or more springs).

Figure 3N:
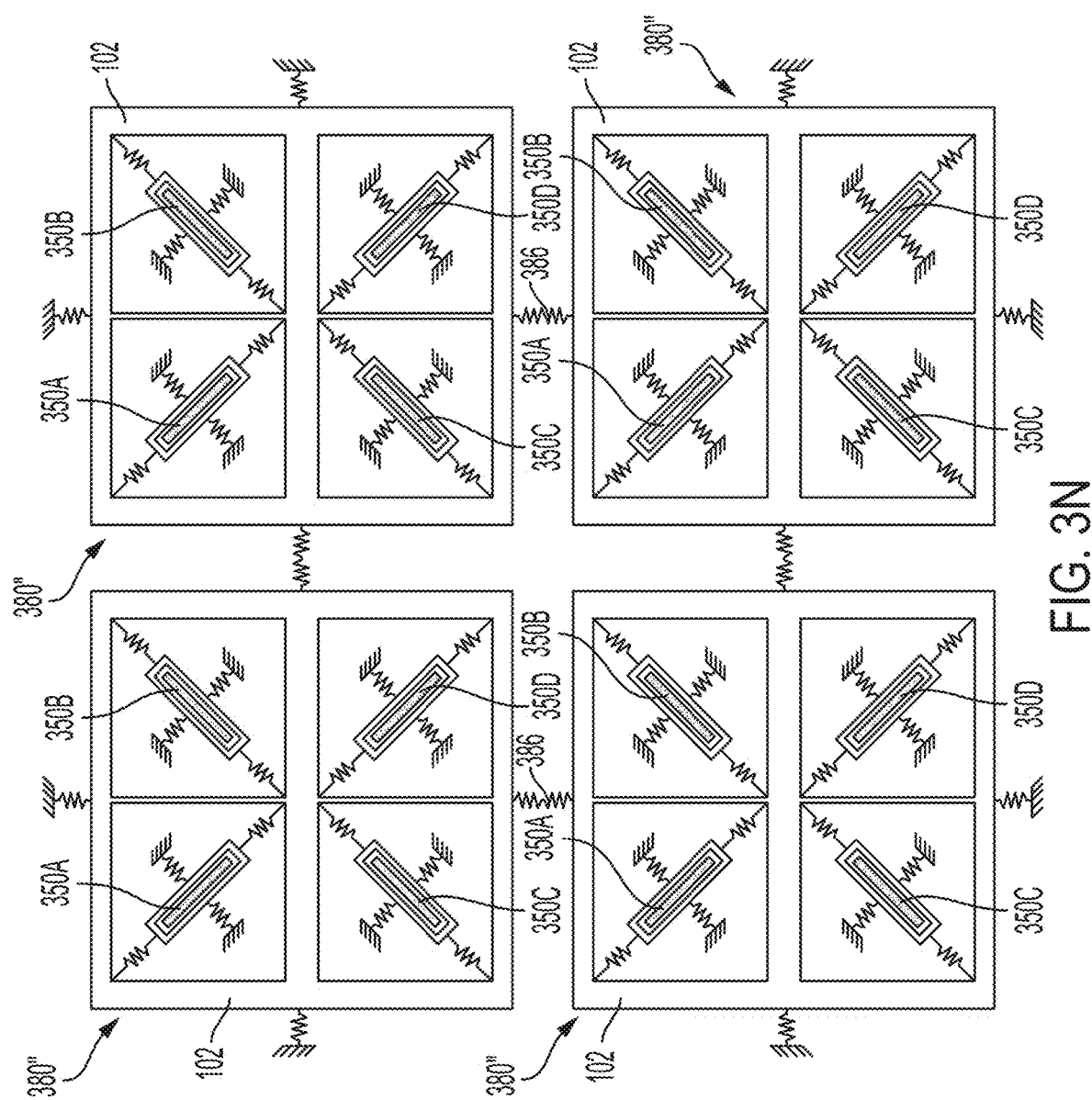
FIG. 3N illustrates multiple of the example MEMS device of FIG. 3M being coupled together, according to some non-limiting embodiments.

FIG. 3N illustrates multiple of the example MEMS device of FIG. 3M being coupled together, according to some non-limiting embodiments. For example, FIG. 3N illustrates two of the example MEMS devices of FIG. 3M being coupled together by couplers 386 (e.g., one or more springs). Accordingly, FIG. 3N comprises four of MEMS device 380" being coupled together.

Figure 3O:
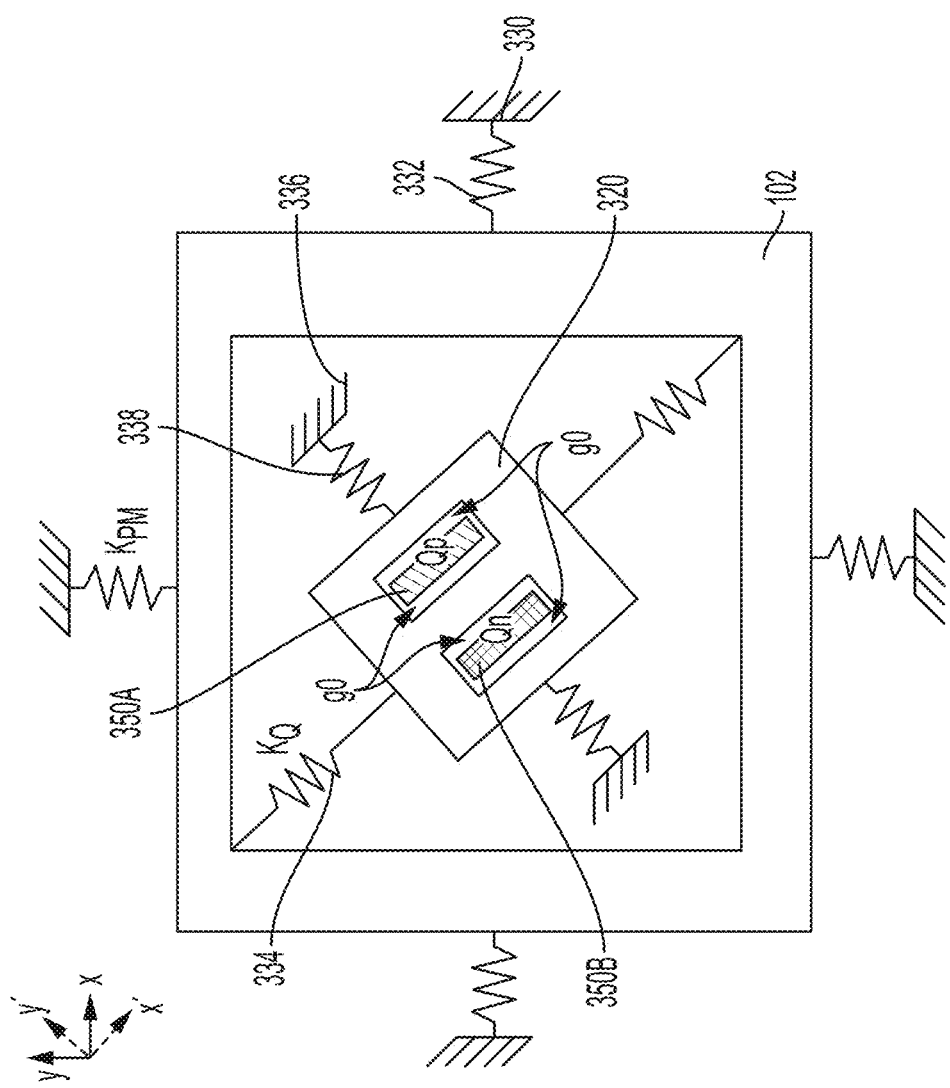
FIG. 3O illustrates the example attenuation mechanism of FIG. 3H implemented with a pair of electrodes, according to some non-limiting embodiments.

FIG. 3O illustrates the example attenuation mechanism of FIG. 3H implemented with a pair of electrodes, according to some non-limiting embodiments. In the illustrated embodiment of FIG. 3O, the inner mass 320 comprises multiple gaps g0 (specifically, two gaps g0). A first electrode 350A (designated Qp) and a second electrode 350B (designated Qn) are disposed in the respective gaps g0 of the inner mass 320. Accordingly, the embodiment of FIG. 3O is implemented using a pair of electrodes 350A, 350B.

The first and second electrodes 350A, 350B may be of opposite polarities (e.g., one electrode being negative and one electrode being positive). For example, the first electrode 350A may be positive and the second electrode 350B may be negative. As described herein, the electrodes 350A, 350B may be configured to perform quadrature trimming.

As described herein, motion of the inner mass 320 may be attenuated relative to motion of the proof mass 102. In some embodiments, the inner mass 320 may be configured to move along an axis that is oriented at a 45 degree angle relative to the x- and y-axes.

It should be appreciated that the dual electrode design illustrated in FIG. 3O may be implemented in place of any of the single electrode designs described herein (e.g., with respect to FIGS. 3B-3N, for example).

Figure 3P:
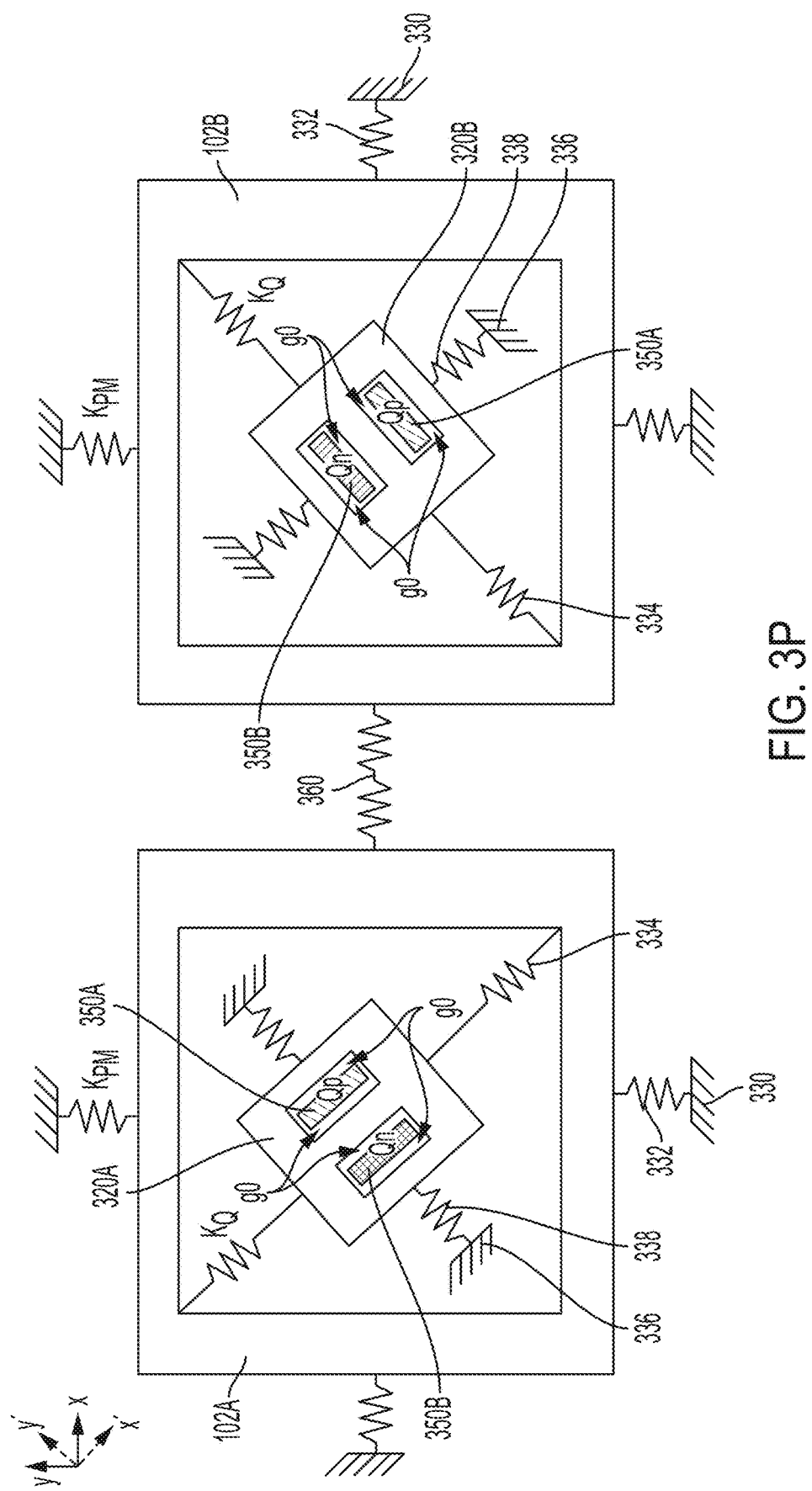
FIG. 3P illustrates the example attenuation mechanism of FIG. 3O in a multi-mass system, according to some non-limiting embodiments.

FIG. 3P illustrates the example attenuation mechanism of FIG. 3O in a multi-mass system, according to some non-limiting embodiments. As shown in FIG. 3P, two proof masses 102A and 102B are coupled together by coupler 360 (e.g., one or more springs). Although in the illustrated embodiment two proof masses are shown being coupled together, the attenuation mechanisms and electrode designs described herein may be implemented in a multi-mass system having any suitable number of proof masses (e.g., at least three proof masses, at least four proof masses, at least six proof masses, at least twelve proof masses, etc.).

Each proof mass 102A, 102B may comprise the components described herein with respect to FIG. 3O. For example, a pair of electrodes 350A, 350B may be disposed in the respective gaps g0 of the inner masses 320A, 320B. Accordingly, in the illustrated embodiment of FIG. 3O, a pair of electrodes 350A, 350B are disposed in respective gaps g0 of each inner mass 320A, 320B. As described herein, the first and second electrodes 350A, 350B may be of opposite polarities (e.g., one electrode being negative and one electrode being positive). For example, the first electrode 350A may be positive and the second electrode 350B may be negative. As shown in FIG. 3P, the second electrode 350B is rotated 90 degrees relative to the first electrode 350A.

Referring again to FIG. 3A, the lever 108 may be linear. Lever 108 is linear when Hooke's law, $F=k*x$, is preserved, where F is the applied force, k is the lever mechanism stiffness, and x is the displacement of the lever 108. A non-linear system, by contrast, can be described as $F=k*x+k_3*x^3$, where $k_3$ is the undesired cubic stiffness of the lever 108. In linear systems the resonant frequency of a body is independent of the amplitude of motion, while in non-linear systems the resonant frequency depends on the displacement of the proof mass. This effect is also known as spring hardening, which means higher resonant frequency for higher amplitude of motion. Higher resonant frequencies require more force for a given displacement, thus decreasing the efficiency of the MEMS device.

Example kinematic linkages having linear lever mechanisms are provided below. In particular, FIGS. 4A-7 illustrate examples of kinematic pivoting linkages that may be implemented in the MEMS device 100. The MEMS device may comprise one or more pivoting linkages configured to transfer motion between the drive and/or sense structure (e.g., a shuttle) and the proof mass 102. In some embodiments, the pivoting linkage may comprise first and second levers 108 of the MEMS device 100 coupled together by a connector. In the illustrated embodiments, the kinematic pivoting linkages comprise at least three bars. That is, the three "bars" of the kinematic pivoting linkage may be coupled together at pivot points, such that a first bar and second bar are coupled together at a first pivot point, and the second bar and a third bar are coupled together at a second pivot point. Accordingly, the respective bars of the kinematic pivoting linkage may pivot freely relative to other bars of the kinematic pivoting linkage. The inventors have recognized that kinematic pivoting linkages having at least three bars may reduce and/or eliminate entirely the cubic stiffness arising when the connector coupling the first and second levers is caused to bend.

Figure 4A:
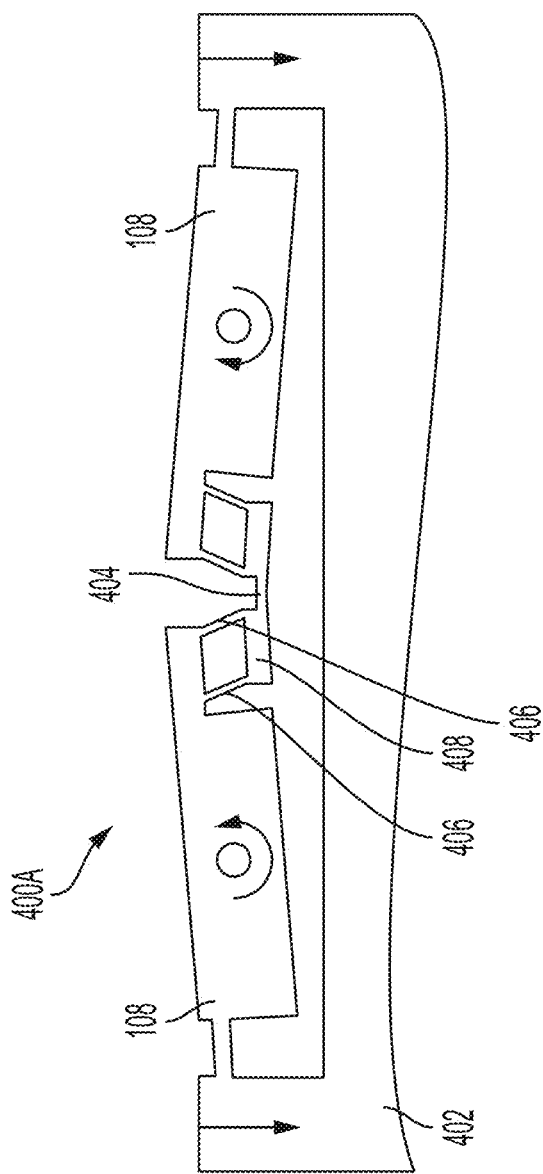
FIGS. 4A-4D illustrate examples of a three bar pivoting linkage, according to some non-limiting embodiments.
Figure 4B:
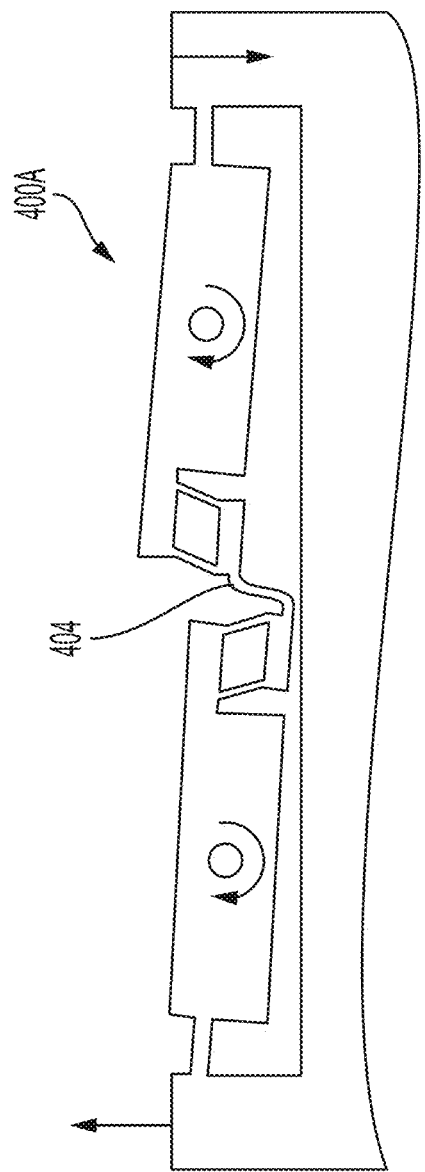
Figure 4C:
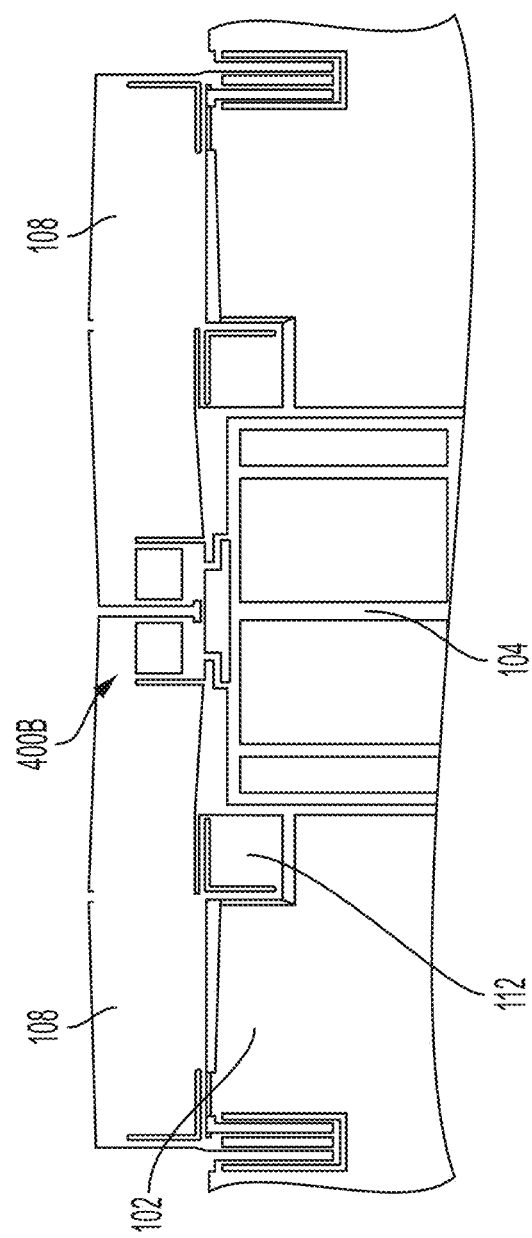
Figure 4D:
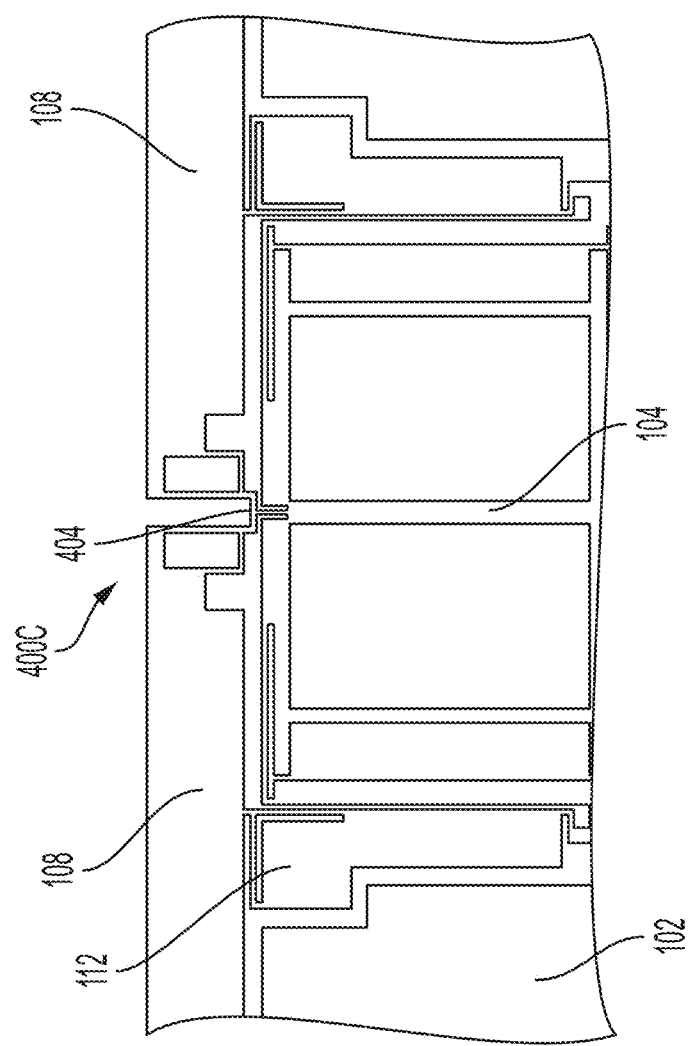

FIGS. 4A-4D illustrate examples of a three bar pivoting linkage, according to some non-limiting embodiments. A three bar pivoting linkage comprises an additional degree of freedom relative to a pivoting linkage having only two bars. FIGS. 4A-4B illustrate a first embodiment of a three bar pivoting linkage 400A. FIG. 4C illustrates a second embodiment of a three bar pivoting linkage 400B. FIG. 4D illustrates a third embodiment of a three bar pivoting linkage 400C.

As shown in FIGS. 4A-4D, a connector 404 disposed between levers 108 is not directly coupled to the levers 108, but rather, the levers 108 are coupled together through a combination of springs 406, and inset 408, and the connector 404. The three bar linkage 400A, 400B, 400C has an additional degree of freedom relative to the two bar linkage shown in FIGS. 4A-4B. In particular, when proximal ends of the levers 108 both move in the same direction (e.g., by rotating in opposite directions), as shown in FIG. 4A, the additional degree of freedom prevents the connector from bending resulting in cubic stiffness without affecting the tilt stiffness ratio. In particular, the connector 404 is prevented from rotating relative to the proof mass 102 when the first and second levers 108 rotate in opposite directions. Instead, the springs 406 allow the inset 408 coupled to each lever 108 to move. The beneficial reduction of quadrature as described with respect to the two bar linkage is still achieved by the three bar linkage, while also reducing or preventing entirely cubic stiffness.

The three bar linkage 400A, 400B, 400C may also be viewed in terms of its pivots. For example, a first of the two levers 108 may be considered a first bar, a second of the two levers 108 may be considered a second bar, and the connector 404 may be considered a third bar. The first bar may be coupled to the proof mass 102 at a first end of the three bar linkage (e.g., via a spring). The first end may comprise a first fixed pivot at the point where the first bar is coupled to the proof mass 102, wherein the first bar is configured to pivot about the first fixed pivot. The second bar may be coupled to the proof mass 102 at a second end of the three bar linkage (e.g., via a spring). The second end may comprise a second fixed pivot, wherein the second bar is configured to pivot about the second fixed pivot. As described herein, the first and second bars, and the second and third bars, may be coupled together at respective dynamic pivot points. Pivots may be dynamic in that the pivot is disposed between two components configured to pivot.

The kinematic pivoting linkages described herein may be coupled to the shuttle in any suitable manner. In FIG. 4C, the three bar linkage 400B is coupled to the drive structure with two folded springs. In FIG. 4D, the three bar linkage 400C is coupled to the drive structure with a single spring.

Figure 4E:
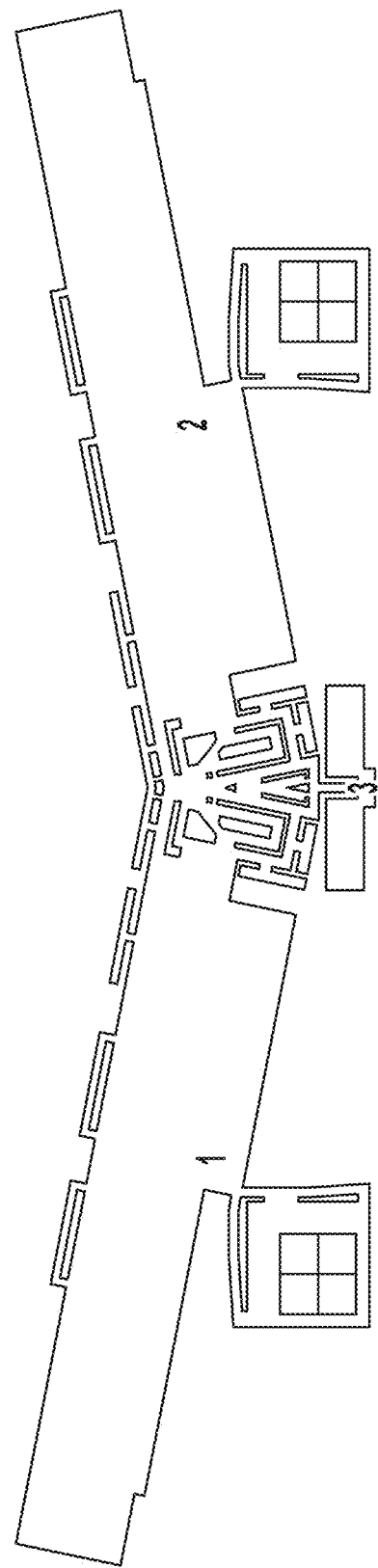
FIG. 4E illustrates the example three bar pivoting linkage of FIGS. 4A-4D in a normal mode of operation, according to some non-limiting embodiments.
Figure 4F:
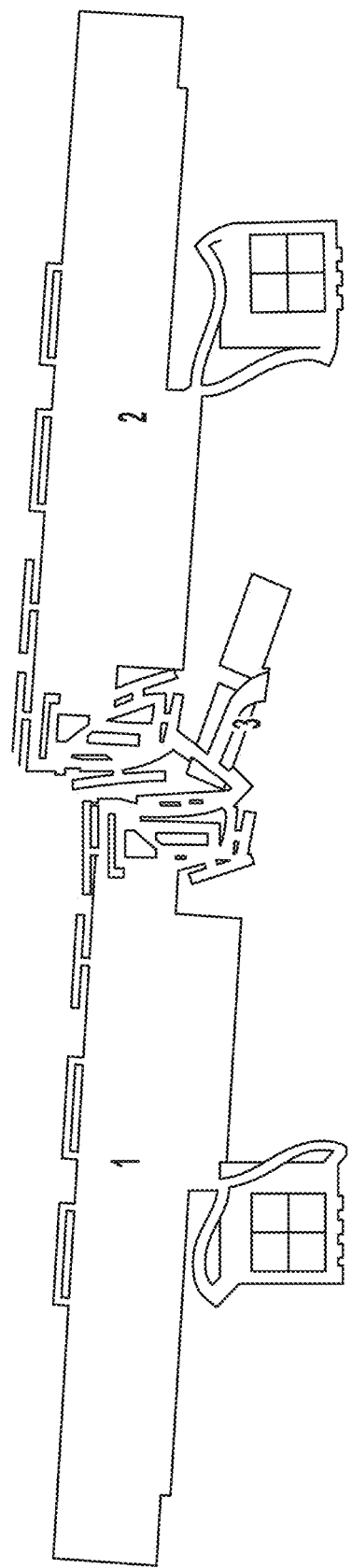
FIG. 4F illustrates the example three bar pivoting linkage of FIGS. 4A-4D in a tilt mode of operation, according to some non-limiting embodiments.

FIG. 4E illustrates the example three bar pivoting linkage of FIGS. 4A-4D in a normal mode of operation, according to some non-limiting embodiments. FIG. 4F illustrates the example three bar pivoting linkage of FIGS. 4A-4D in a tilt mode of operation, according to some non-limiting embodiments.

Figure 5A:
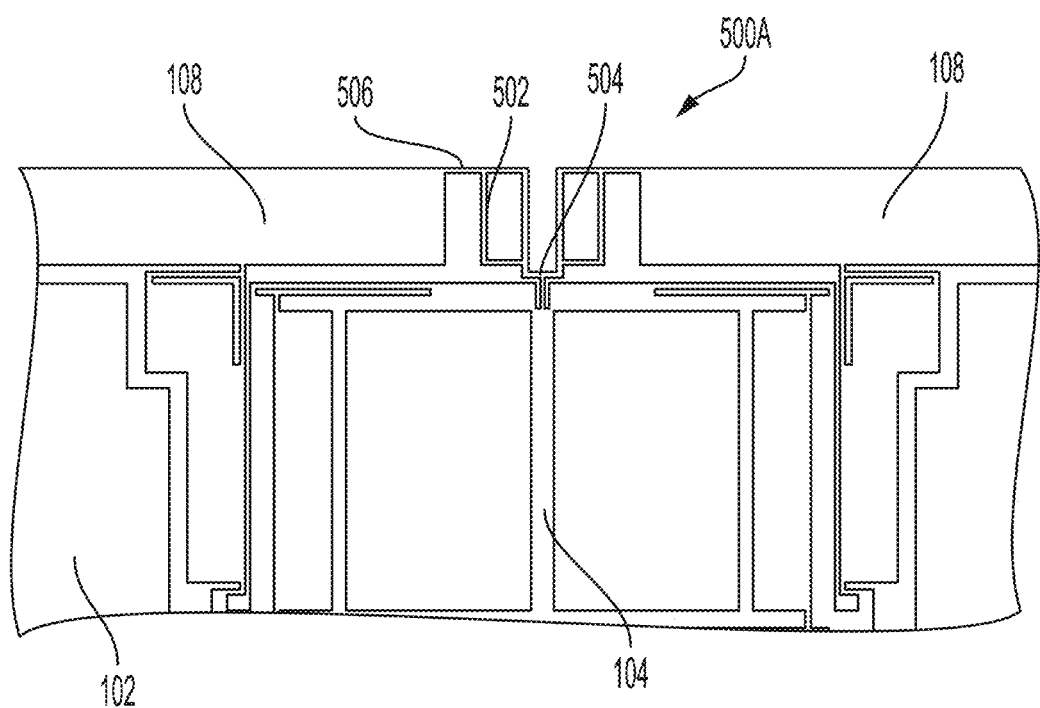
FIGS. 5A-5B illustrate examples of a four bar pivoting linkage, according to some non-limiting embodiments.
Figure 5B:
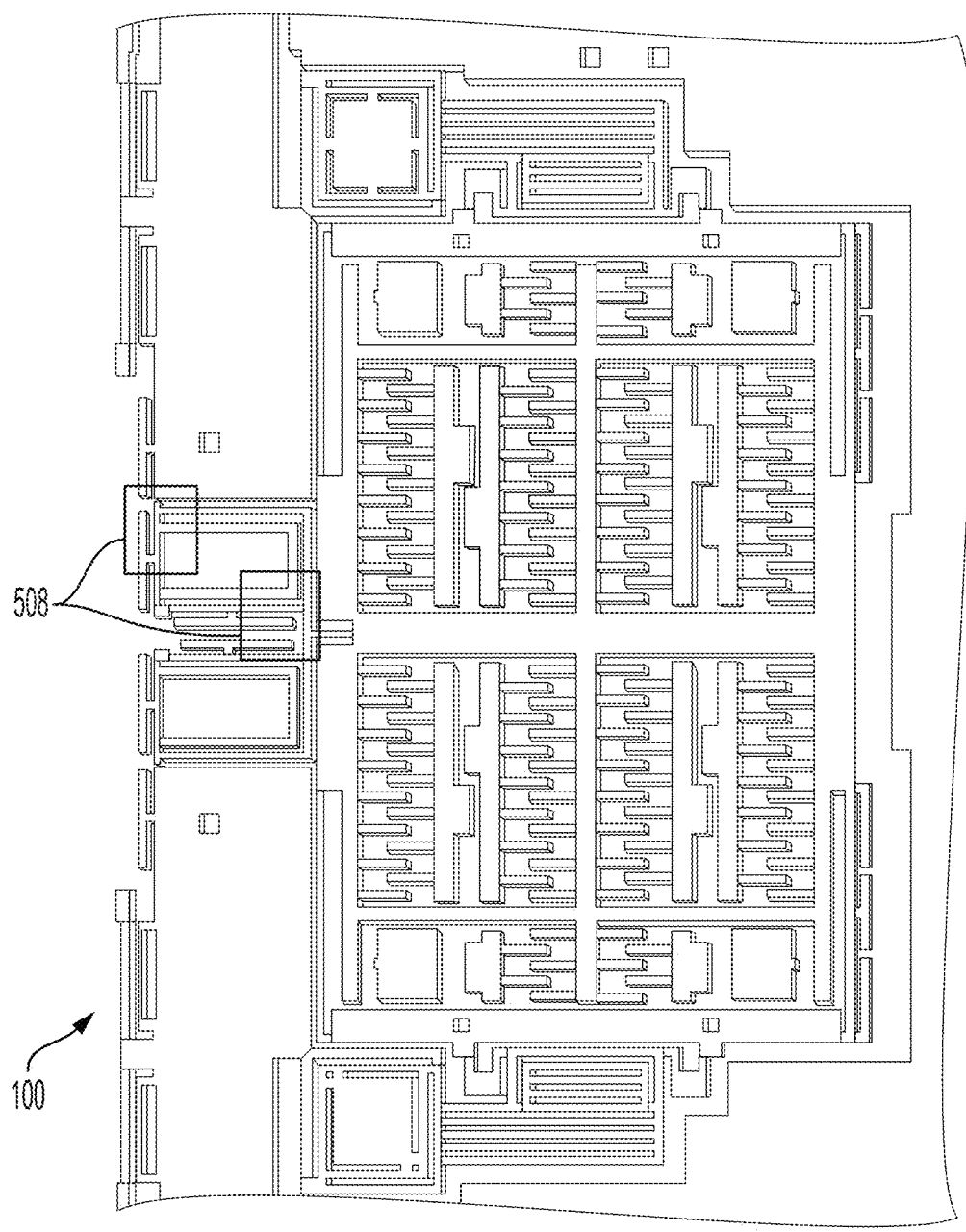

FIGS. 5A-5D illustrate examples of a four bar pivoting linkage 500A, according to some non-limiting embodiments. As shown in FIG. 5A, the four bar pivoting linkage 500A may comprise a box spring 402. The respective box springs may be coupled to the respective levers 108 through respective tethers 506, and to each other through a connector 504. In the illustrated embodiment, the four bar linkage 500A is coupled to the drive structure 104 through a single T-shaped connection 504, however, other configurations are possible. For example, in some embodiments, the four bar linkage 500A may be coupled to the drive structure 104 through two or more springs. As shown in FIG. 5B, the four bar linkage 500A has least two pivot points 508 per lever 108. The inventors have recognized that the four bar linkage is advantageous for reducing sensitivity of the MEMS device to shear stress while also reducing cubic stiffness.

Figure 5C:
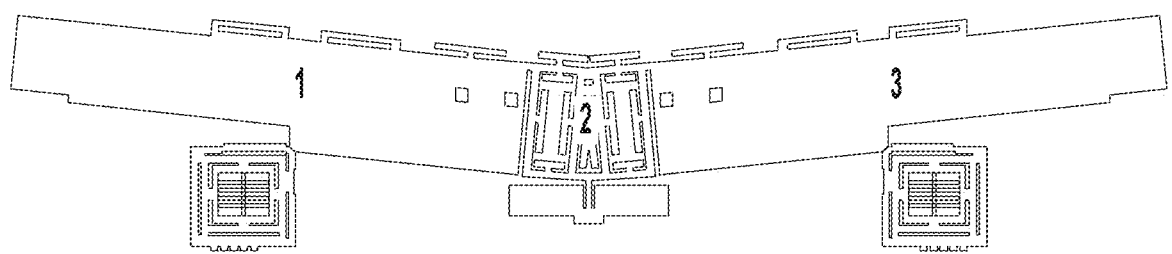
FIG. 5C illustrates the example four bar pivoting linkage of FIGS. 5A-5B in a normal mode of operation, according to some non-limiting embodiments.
Figure 5D:
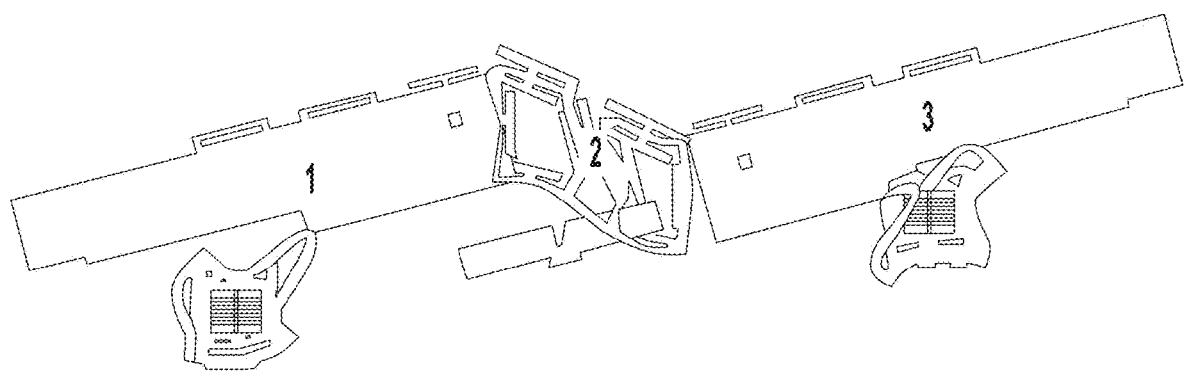
FIG. 5D illustrates the example four bar pivoting linkage of FIGS. 5A-5B in a tilt mode of operation, according to some non-limiting embodiments.

FIG. 5C illustrates the example four bar pivoting linkage of FIGS. 5A-5B in a normal mode of operation, according to some non-limiting embodiments. FIG. 5E illustrates the example four bar pivoting linkage of FIGS. 5A-5B in a tilt mode of operation, according to some non-limiting embodiments. As shown in FIGS. 5C-D, the double box spring elements of the pivoting linkage behave as a rigid bar in a tilt mode of operation, allowing the linkage to act as a three bar system.

Figure 6:
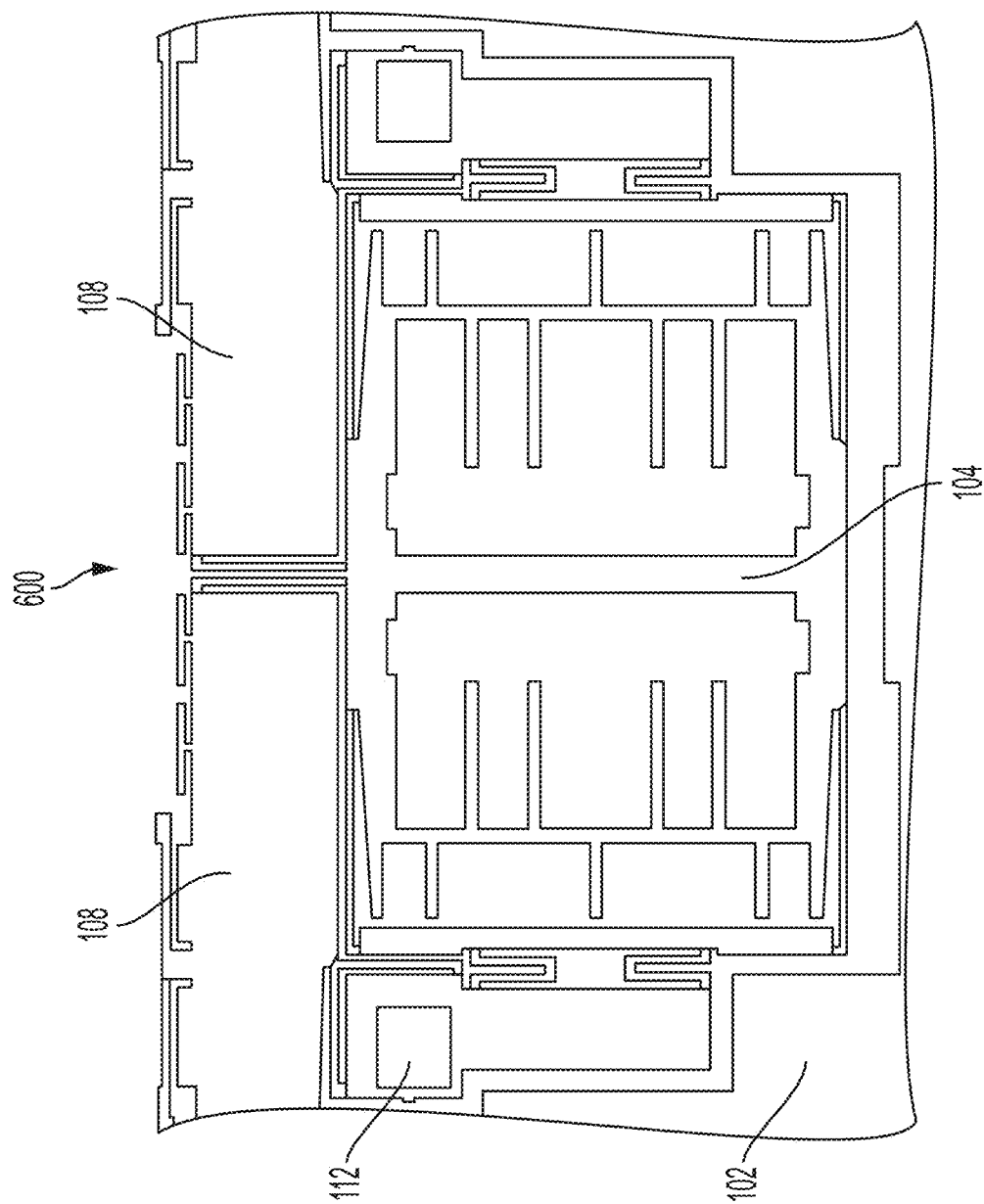
FIG. 6 illustrates a further example of a four bar pivoting linkage, according to some non-limiting embodiments.

FIG. 6 illustrates a further example of a four bar pivoting linkage 600, according to some non-limiting embodiments. The pivoting linkage of FIG. 6 comprises four segments, with two segments per lever 108. In the illustrated embodiment of FIG. 6, the four bar linkage couples the levers together through the drive structure 104. In particular, the respective levers 108 are each coupled to the drive structure 104 (e.g., via springs), without being coupled directly together. The inventors have recognized that the four bar linkage design illustrated in FIG. 6 is advantageous for reducing sensitivity of the MEMS device 100 to both normal and shear stress while also reducing cubic stiffness.

Figure 7:
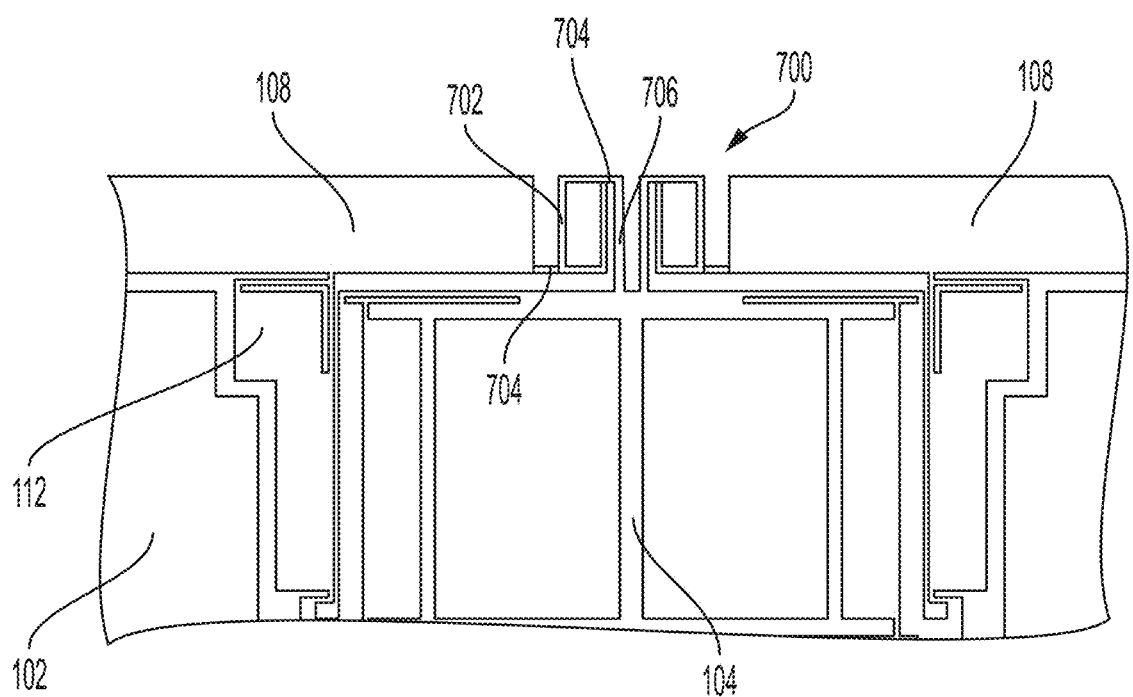
FIG. 7 illustrates an example of a five bar pivoting linkage, according to some non-limiting embodiments.

FIG. 7 illustrates an example of a five bar pivoting linkage 700, according to some non-limiting embodiments. The five bar linkage 700 shown in FIG. 7 combines aspects of the four bar pivoting linkages illustrated in FIGS. 5A-6. For example, the five bar pivoting linkage 700 comprises respective box springs 702 coupled to the respective levers 108. In addition, the respective levers are coupled together through the drive structure while not being coupled together directly, through a connector, for example (e.g., through respective springs 706). The respective box springs 702 are coupled to the springs 706 and levers 108 via tethers 704. The inventors have recognized that the five bar linkage design illustrated in FIG. 7 may be advantageous for reducing both shear stress sensitivity and non-linearities arising from increased cubic stiffness.

As described herein, use of pivoting linkages of the types described herein (e.g., pivoting linkages having at least three bars) may increase the linearity of a gyroscope by preventing increased cubic stiffness in the gyroscope. Cubic stiffness arises where linking beams of the gyroscope are caused to bend and stretch. The silicon of the linking beams harden as a result, causing increased stiffness of the linking beam. The increased stiffness causes frequency to change and increase with displacements at high amplitudes.

Figure 8A:
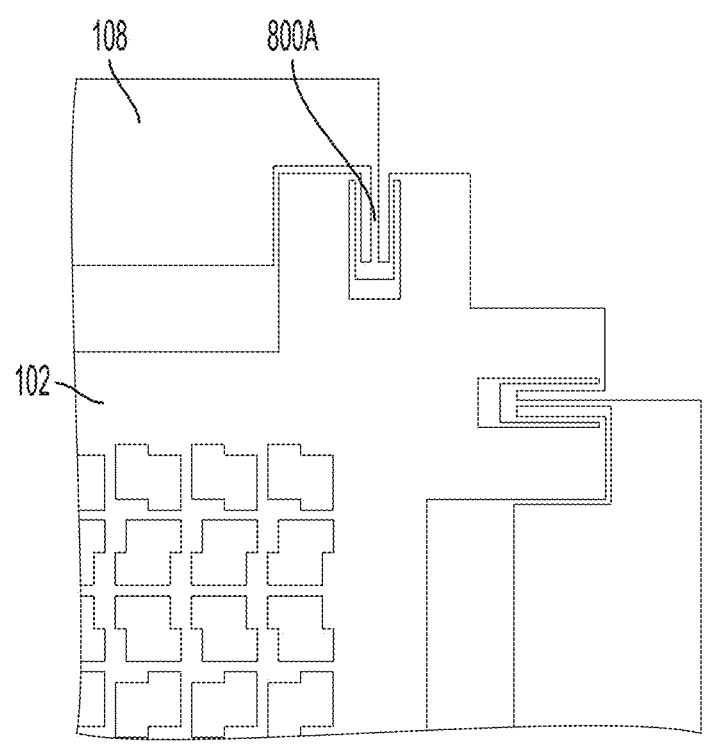
FIGS. 8A-8B illustrate example folded springs for coupling a proof mass to a shuttle, according to some non-limiting embodiments.
Figure 8B:
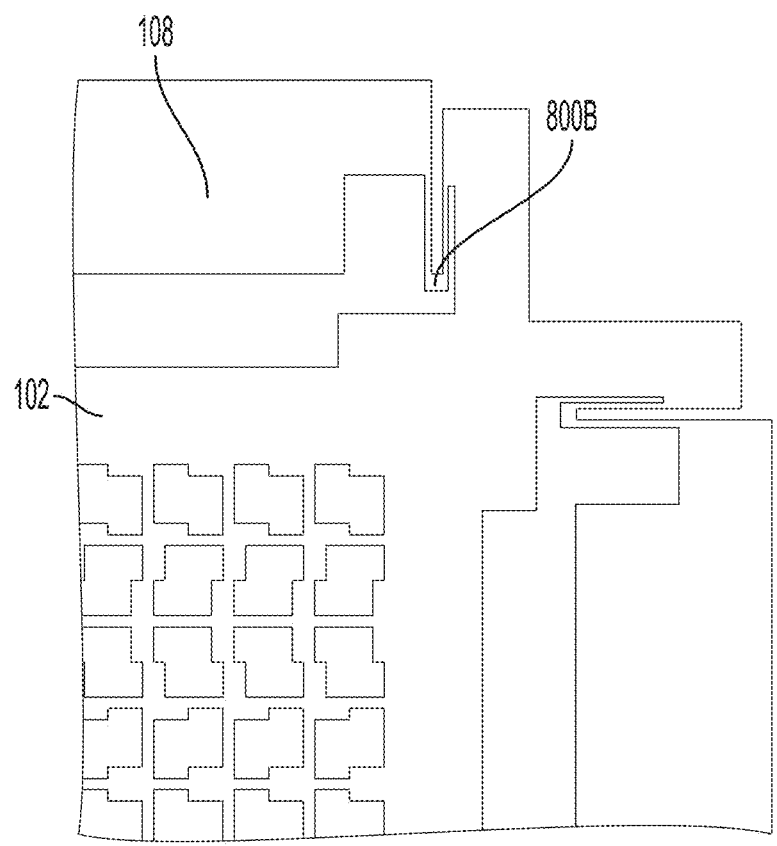

FIGS. 8A-8B illustrate example folded springs 800A, 800B for coupling a proof mass 102 to a shuttle 104A, 104B, 106A, 106B, according to some non-limiting embodiments. According to some aspects, the proof mass 102 may be coupled to the shuttle so as to reduce cubic stiffness and increase linearity of the MEMS device 100.

In the illustrated embodiments, as described herein, the proof mass 102 is coupled to the respective shuttles via levers 108. In some embodiments, the proof mass 102 may be coupled to a respective lever via a folded spring. In some embodiments, the folded spring may comprise a double hair pin spring 800A, as shown in FIG. 8A. In some embodiments, the folded spring may comprise a single hair pin spring 800B, as shown in FIG. 8B.

Electrode Design

As described herein, some aspects of the technology relate to new electrode designs. For example, in some embodiments, one or more electrodes (e.g., quadrature trimming electrodes) may be disposed inside openings of the proof mass. In some embodiments, one or more electrodes may be disposed in an inner portion of the proof mass having attenuated motion relative to other portions of the proof mass. As described herein, the quadrature trimming electrodes may be symmetric and function independently of the direction of drive motion. In some embodiments, the quadrature trimming electrodes may perform frequency tuning in addition to quadrature trimming.

The one or more electrodes described herein may be configured to operate in-plane with the motion of the proof mass. That is, for parallel plate electrodes, a distance between the plates may extend in a direction along the drive axis. As described herein, the one or more electrodes may comprise quadrature trimming electrodes. Accordingly, the quadrature trimming electrodes may be configured as parallel plate electrodes having a gap between the parallel plates that extends in a direction along the drive axis.

As described herein, the MEMS device 100 may provide for attenuated motion of a portion of the MEMS device 100 (e.g., the proof mass 102, the inner mass 320) while also providing for maximum linearity of the MEMS device 100 by reducing and/or eliminating entirely the cubic stiffness of spring connections of the MEMS device 100. Attenuation of the MEMS device motion may be facilitated using one or more of the attenuation mechanisms described herein. For example, configuring pivot points of the levers away from the center of the linkage adjusts the ratio of motion between the proof mass and the shuttle. Moving the pivot point away from the shuttle and closer to an end of the lever being coupled to the proof mass causes the motion of the shuttle to be amplified and the motion of the proof mass to be attenuated. In some embodiments, motion of a portion of the proof mass (e.g., the inner mass 320 described herein) may be attenuated, for example, according to the techniques described herein.

The inventors have recognized that quadrature trimming electrodes may be advantageously placed in a portion of the MEMS device having attenuated motion. In some embodiments, the quadrature trimming electrodes are disposed in openings of the proof mass and motion of the proof mass is attenuated. In some embodiments, only a portion of the proof mass exhibits attenuated motion and the quadrature trimming electrodes are disposed in the portion of the proof mass that exhibits attenuated motion. The inventors have recognized that disposing the quadrature trimming electrodes in a portion of the MEMS device which experiences less motion allows for more efficient transduction of the electrostatic electrodes for quadrature trimming (e.g., parallel plate electrodes).

Figure 9:
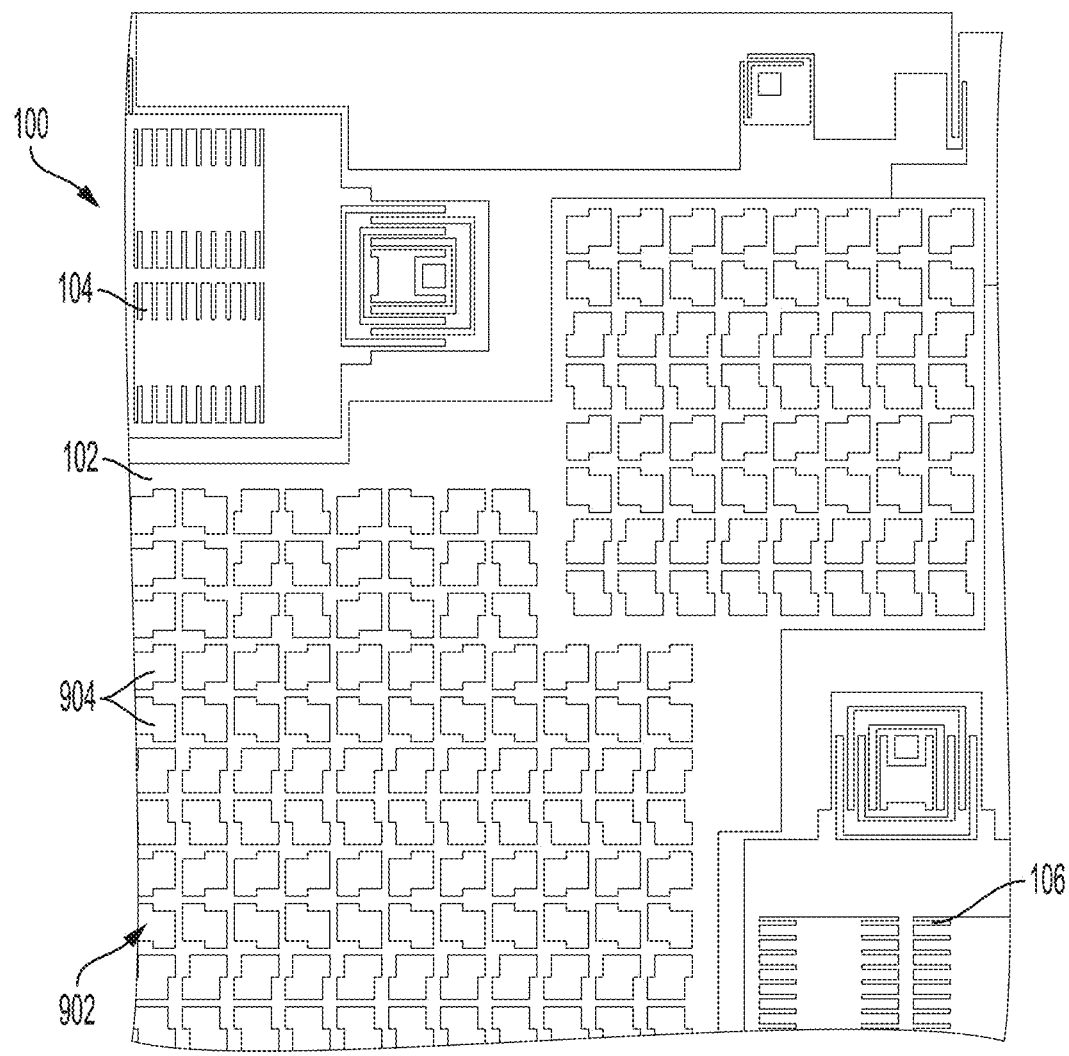
FIG. 9 is a partial view of the example MEMS device of FIG. 1 illustrating openings in the proof mass, according to some non-limiting embodiments.

FIG. 9 is a partial view of the example MEMS device 100 of FIG. 1, according to some non-limiting embodiments.

According to some aspects, the proof mass 102 is provided with a plurality of openings 902 distributed throughout the surface of the proof mass 102. Each opening 902 may have an electrode disposed therein, configured to perform quadrature trimming for the MEMS device 102. According to some embodiments, each opening 902 may include one half of an electrode pair 904, with an adjacent opening 902 comprising a second half of the electrode pair 904. However, it should be appreciated that other configurations of the quadrature trimming electrodes are possible.

The quadrature trimming electrodes may be disposed in a portion of the MEMS device which experiences motion in two degrees of freedom (e.g., along the resonator axis and along a second axis substantially perpendicular to the resonator axis). In the illustrated embodiments, the quadrature trimming electrodes are disposed in the proof mass. In some embodiments, the quadrature trimming electrodes are symmetric such that the electrodes function independently of the axis of drive, as described further herein. For example, the quadrature trimming electrodes operate when the drive motion is along the x-axis as well as when the drive motion is along the y-axis, allowing for switching between drive and sense axes without needing to reconfigure (e.g., reposition components, add additional components, or rewire components) the gyroscope.

Quadrature trimming electrodes facilitate reduction of quadrature. Quadrature is motion of the proof mass in the direction orthogonal to the drive motion, which is ideally 90° out of phase with the Coriolis response. Typically, quadrature is undesirable, as a gyroscope may be unable to distinguish between electrical signals resulting from quadrature as opposed to those resulting from rotation, and thus the accuracy of the gyroscope at detecting rotation may be negatively impacted by the occurrence of quadrature. Accordingly, quadrature trimming, which reduces quadrature through application of electrical signals to quadrature trimming electrodes to generate a force opposite the force of quadrature, is beneficial for the accuracy of the gyroscope.

As described herein, the motion of the proof mass may be attenuated so as to allow for quadrature trimming electrodes with small gaps (e.g., approximately 2 microns). For an isotropic gyroscope, the efficiency of quadrature trimming electrodes is based on the size of the gaps g1 and g2 between a quadrature trimming electrode and an adjacent side wall of the MEMS device. In the case of the quadrature trimming electrodes described herein, g1 and g2 are defined by the distance between the quadrature trimming electrode and an adjacent side wall of the proof mass. g1 represents a minimum dimension of the gap 902 and g2 represents a maximum dimension of the gap 902. The force generated by the quadrature trimming electrodes drop rapidly as the maximum gap g2 increases. In particular, the force generated by the quadrature trimming electrodes in the direction orthogonal to the drive direction is proportional to the inverse of the gap squared. Accordingly, a larger gap decreases the efficiency of the gyroscope.

However, in order to prevent breakage of the MEMS device, the gap between the quadrature trimming electrodes and the proof mass should be at least as large as the displacement of the proof mass. Accordingly, the inventors have recognized that the motion of the proof mass can be attenuated, as described herein, to allow for high efficiency quadrature trimming electrodes (e.g., with small gaps) that are disposed inside openings of the proof mass.

Figure 10B:
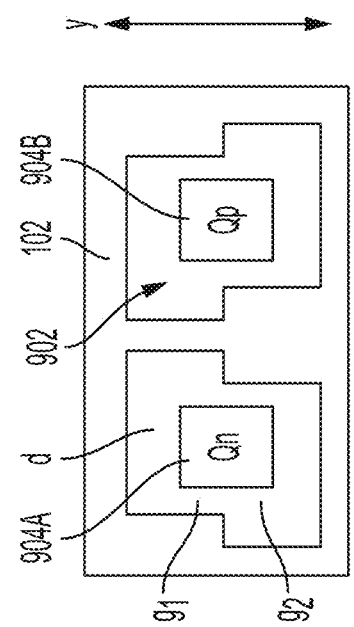
FIGS. 10A-10B illustrate example electrodes disposed in openings of the example MEMS device, according to some non-limiting embodiments.
Figure 10A:
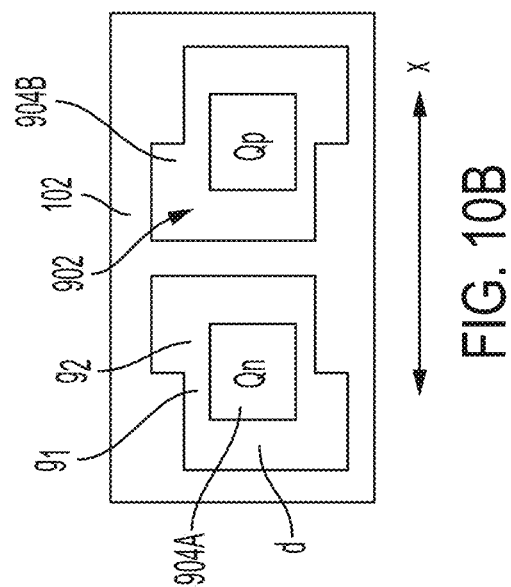

FIGS. 10A-10B illustrate example electrodes 904A, 904B disposed in openings of the example MEMS device, according to some non-limiting embodiments. As previously described herein, the electrodes 904A, 904B are disposed in openings (e.g., gaps) 902 of the proof mass 102. g1 reflects the minimum dimension between the electrode 904A, 904B and the proof mass, g2 reflects the maximum dimension between the electrode 904A, 904B and the proof mass 102, and d represents the maximum displacement of the proof mass.

As described herein, the electrodes 904A, 904B may be disposed in pairs. For example, As shown in FIGS. 10A-10B a first electrode 904A (denoted Qn) acts in a pair with a second electrode 904B (denoted Qp) to perform quadrature trimming. As described herein, the pair of electrodes 904A, 904B may also act as a pair to perform frequency trimming for the MEMS device 100.

FIG. 10A illustrates an example of quadrature trimming electrodes for a MEMS device having a drive mode along the y-axis. FIG. 10B illustrates an example of quadrature trimming electrodes for a MEMS device having a drive mode along the x-axis. That is, the maximum dimension g2 for the quadrature trimming electrodes of FIG. 10A is along the y-axis and the minimum dimension g1 for the quadrature trimming electrodes of FIG. 10A is along the x-axis. For the quadrature trimming electrodes of FIG. 10B, the maximum dimension g2 is along the x-axis while the minimum dimension g1 is along the y-axis.

For an isotropic MEMS gyroscope, the maximum dimension g2 may be substantially equal along the x-axis and y-axis so that the direction of the drive motion may be switched as desired. In some embodiments, the maximum dimension g2 is configured such that the drive mode direction may be adjusted to be along any axis (including axes at an angle relative to the x- and y-axes, e.g., 45 degrees from the x-axis). Accordingly, an isotropic gyroscope may be considered as having no pre-defined drive mode direction.

No pre-defined motion means the gyroscope can be driven at any angle by applying a combination of forces along the x- and/or y-axes. If motion along the x-axis is required, then a force along x-axis is applied to the proof mass via a drive structure, and, conversely, for the y-axis direction, only force along the y-axis is applied to the proof mass. If the motion along an axis 45 degrees from the x- or y-axis is desired, then an equal force along the x- and y-axes may be applied to the proof mass.

In one embodiment, quadrature trimming electrodes are adapted for the MEMS device using alternating pairs of x-axis and y-axis quadrature trimming electrodes, as can be seen in FIG. 9. In particular, FIG. 9 illustrates alternating pairs of the quadrature trimming electrodes shown in FIGS. 10A-10B.

Figure 11:
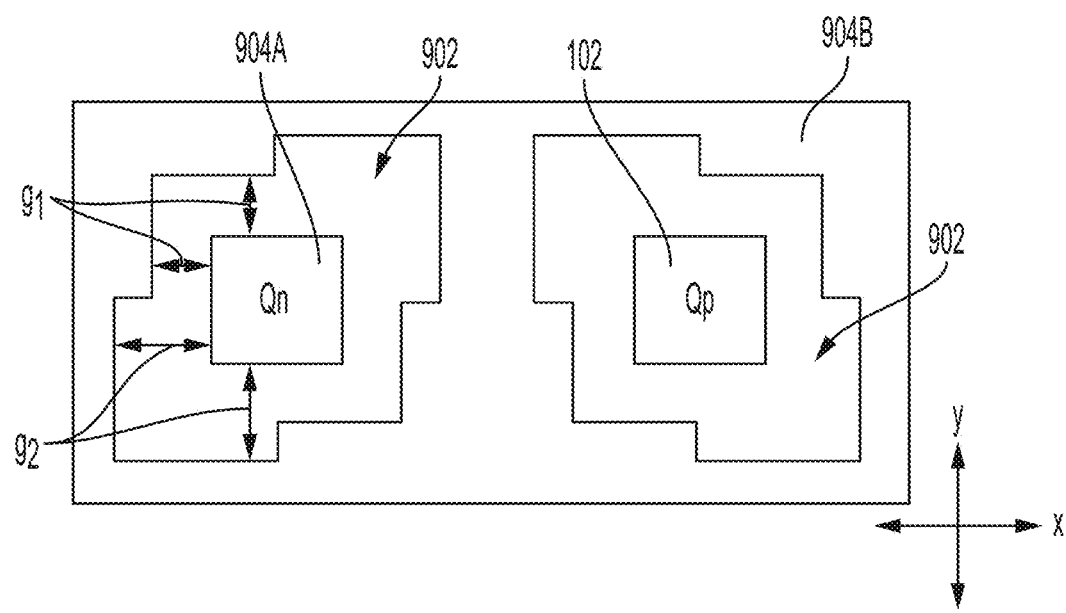
FIG. 11 illustrates another example of electrodes disposed in openings of the example MEMS device, according to some non-limiting embodiments.

FIG. 11 illustrates another example of electrodes disposed in openings of the example MEMS device, according to some non-limiting embodiments. As shown in FIG. 11, the quadrature trimming electrodes 904A, 904B of FIG. 11 are disposed in openings 902 of the proof mass 102 having maximum dimensions g2 along the x- and y-axes that are equal. In addition, the openings 902 in FIG. 11 have minimum dimensions g1 along the x- and y-axes that are equal.

The openings 902 illustrated in FIG. 11 are non-rectangular. In addition, the openings are symmetrical. In particular, the openings 902 exhibit 180 degree rotational symmetry such that the openings are identical when rotated by 180 degrees.

Figure 12A:
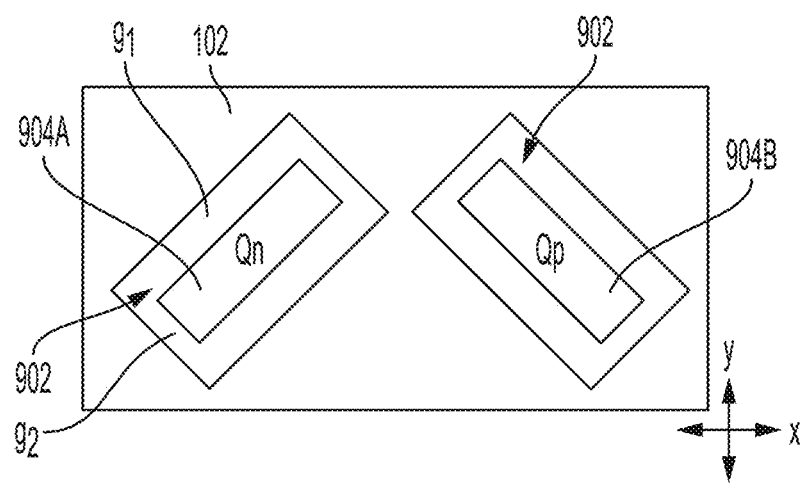
FIG. 12A illustrates yet another example of electrodes disposed in openings of the example MEMS device, according to some non-limiting embodiments.

FIG. 12A illustrates yet another example of electrodes disposed in openings of the example MEMS device, according to some non-limiting embodiments. As shown in FIG. 12A, the quadrature trimming electrodes 904A, 904B are disposed in pairs in openings 902 of the proof mass 102.

In the illustrated embodiment of FIG. 12A, the quadrature trimming electrodes are parallel plate electrodes disposed at 45 degree angles relative to the y-axis. The openings 902 are likewise disposed at 45 degree angles relative to the y-axis. The shape of the gap 902 allows for the quadrature trimming electrodes to function independently of the direction of drive motion.

Figure 12B:
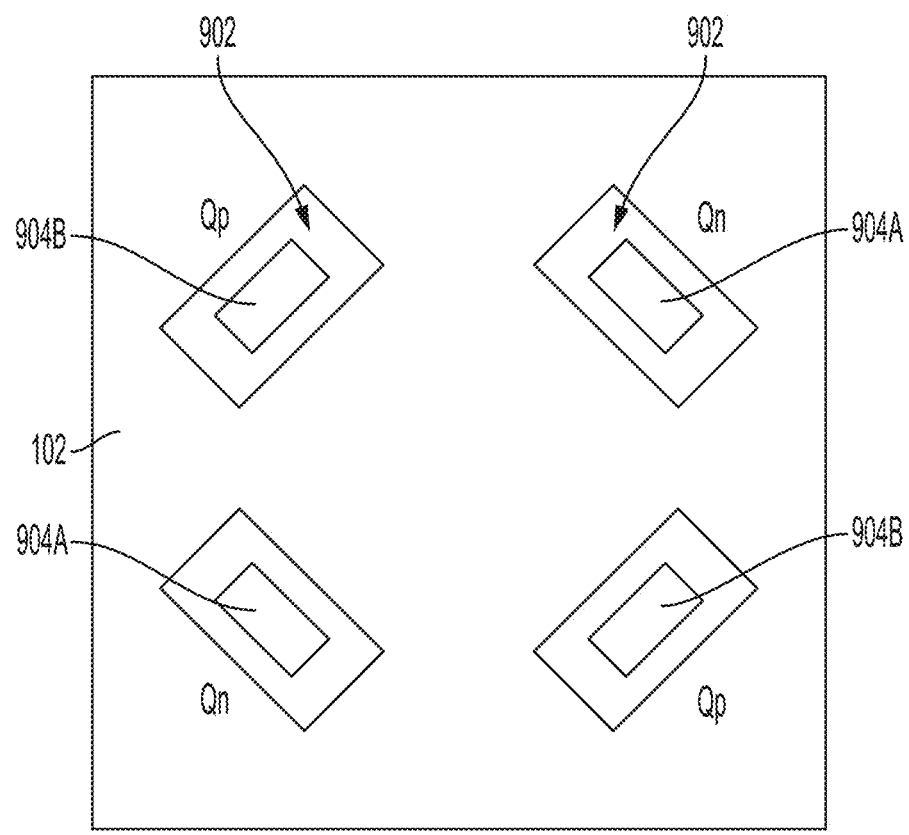
FIG. 12B illustrates multiple of the example electrodes of FIG. 12A disposed in openings of the example MEMS device, according to some non-limiting embodiments.

FIG. 12B illustrates multiple of the example electrodes of FIG. 12A disposed in openings of the example MEMS device, according to some non-limiting embodiments. FIG. 12A illustrates an example of an array of electrodes 904A, 904B disposed in openings 902 of the proof mass 102. As previously described herein, the electrodes 904A, 904B are disposed in pairs in openings 902 of the proof mass 102.

It should be appreciated that the electrodes disposed in the openings of the proof mass as described herein may be in addition to the plurality of electrodes disposed in shuttles of the MEMS device. For example, each of the shuttles (the drive and/or sense structures) may comprise a plurality of electrodes (which may, in some embodiments, comprise comb finger electrodes). The plurality of electrodes disposed in the one or more drive structures of the MEMS device may drive motion of the proof mass along a resonator axis. The plurality of electrodes disposed in the one or more sense structures may detect motion of the proof mass along the resonator axis. In addition, the MEMS device may comprise a plurality of electrodes disposed in openings of the proof mass for performing quadrature trimming. The plurality of electrodes disposed in the proof mass may comprise parallel plate electrodes.

According to some embodiments, the quadrature trimming electrodes may also serve as frequency tuning electrodes in addition to performing quadrature trimming. In particular, the electrodes disposed in the proof mass may be coupled to circuitry providing a voltage which allows for both quadrature trimming and frequency tuning. In particular, a differentially applied voltage to the Qn and Qp electrode pair causes the electrodes to act as quadrature trimming electrodes, while a common voltage (e.g., a same voltage) applied to both the Qn and Qp electrode pair causes the electrodes to act as a frequency trimming electrodes. The inventors have recognized that using the quadrature trimming electrodes to also perform frequency tuning reduces the number of components in the MEMS device and reduces the amount of space required by the MEMS device.

As described herein, the MEMS device 100 may be mode-matched. That is, the frequency of the drive and sense modes of the gyroscope may be equal. The drive mode frequency may be controlled by controlling the frequency of the voltage applied to the drive electrodes of the MEMS device. The sense mode frequency may be controlled by use of frequency tuning electrodes which tune a frequency of the sense mode. According, use of the dual-purpose quadrature trimming and frequency trimming electrodes described herein facilitate operation of the MEMS device as a mode-matched gyroscope.

Nested Spring

Figure 13A:
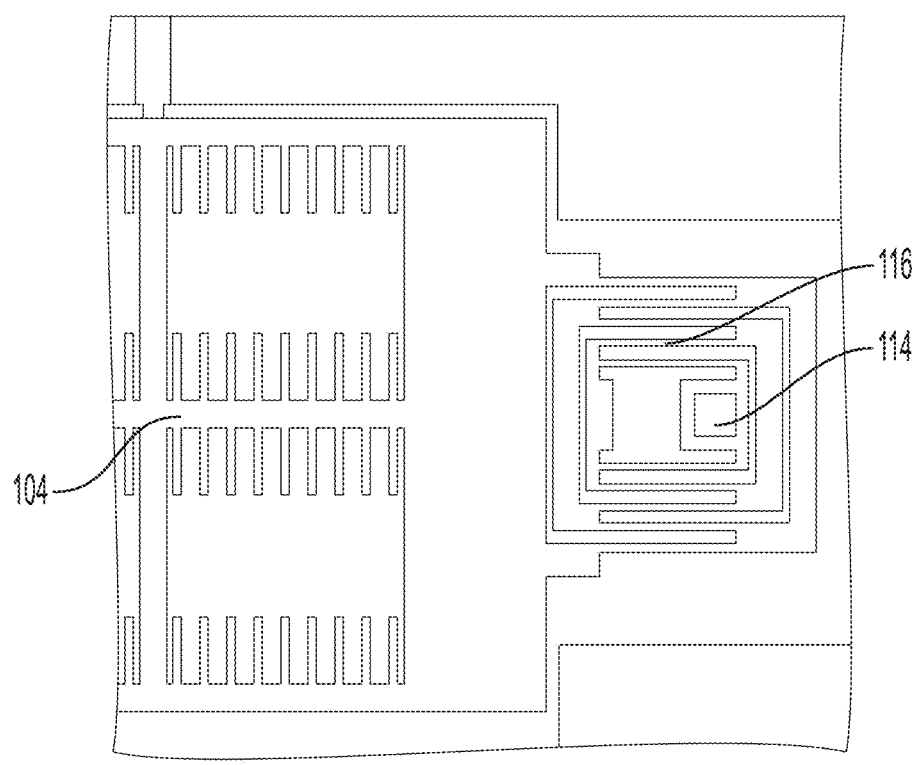
FIGS. 13A-13B illustrate an example nested springs for coupling a shuttle to an anchor, according to some non-limiting embodiments.
Figure 13B:
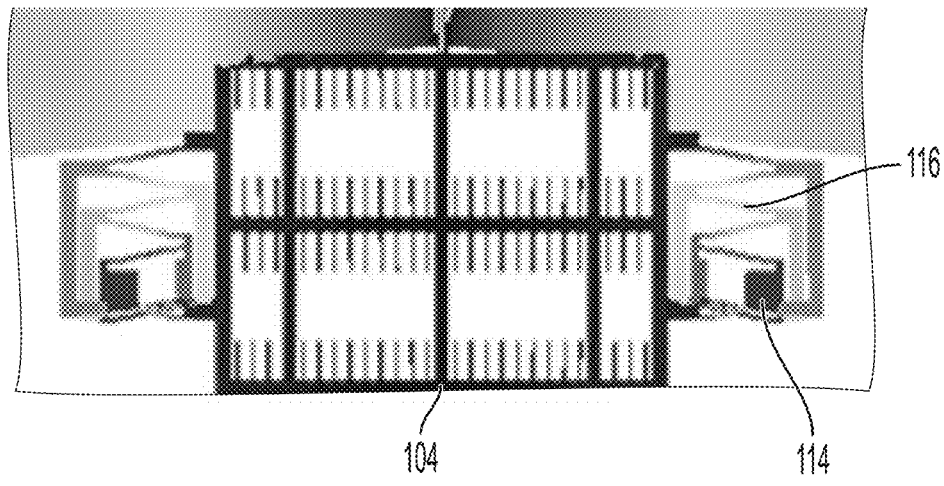

FIGS. 13A-13B illustrate example nested springs 116 for coupling a shuttle to an anchor 114, according to some non-limiting embodiments. For example, in some embodiments, a nested spring 116 is provided for coupling a shuttle 104 of the MEMS device 100 to an anchor 114 of an underlying substrate. As shown in FIG. 13A, the nested spring is symmetric and encompasses a relatively small area. In particular, the nested spring 116 may be configured having gaps of approximately 1-2 microns between portions of the nested spring 116.

The nested spring 116 may provide a superior stiffness ratio in the orthogonal directions for quadrature reduction. In some embodiments, the nested spring 116 may have superior angular stiffness also for quadrature reduction. In some embodiments, the nested spring 116 may reduce the dependence of stiffness match on the random variation of etching within a structure, further reducing quadrature in a relatively small area. In some embodiments, the nested spring may sustain large deformations (e.g., 10 μm or more) without experiencing adverse effects such as spring stiffening.

In some embodiments, the nested spring 116 may serve as a stress relief mechanism. In particular, the nested spring 116 may prevent the shuttle 104 from moving when the anchor 114 is caused to move due to package deformations. As a result, the motion of the anchor 114 is not coupled into the proof mass 102 through the shuttle 104, but rather the nested spring 116 absorbs any deformation of the anchor 114.

The nested spring 116 may comprise a plurality of folds, such that the nested spring 116 has a plurality of folded portions. Each half of the nested spring 116 may comprise the plurality of folded portions. The folded portions of the nested spring 116 may extend outwards from a center of the nested spring (e.g., a central axis running through the anchor 114).

The nested spring 116 may be symmetric, as described herein. For example, as shown in the illustrated embodiment, the nested spring may exhibit bilateral symmetry. That is, the nested spring 116 may be divided into first and second halves by a central axis running through the anchor, and the first and second halves of the nested spring 116 may be identical.

FIG. 13B illustrates the example nested spring when the shuttle is displaced. The nested spring of FIGS. 13A-13B may allow for high amplitude displacement of the shuttle while also encompassing little space on the die.

As shown in FIG. 13B, and further in FIG. 1, the MEMS device 100 may comprise multiple nested springs 116. For example, a shuttle may comprise a nested spring 116 on each side of the shuttle, coupling the shuttle to respective anchors of the MEMS device 100. In some embodiments, each shuttle of the MEMS device 100 may be coupled to at least one nested spring 116 (e.g., a nested spring on each side of each shuttle, as shown in FIG. 1).

Figure 13C:
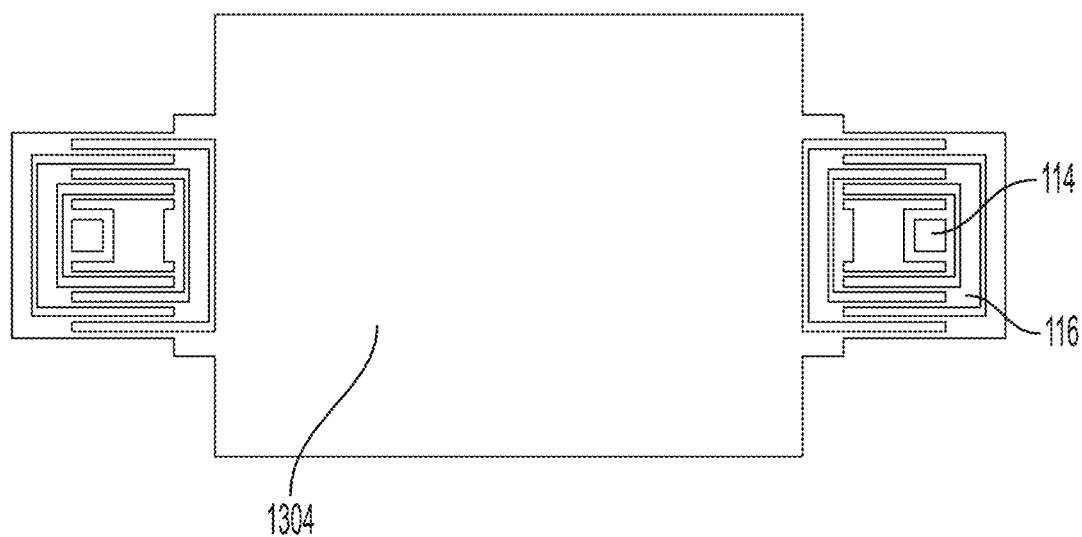
FIG. 13C illustrates an example nested spring of an example MEMS device, according to some non-limiting embodiments.

It should be appreciated that the nested springs described herein may be applicable in one or more other devices and are not limited to use in MEMS gyroscopes. For example, FIG. 13C illustrates an example nested spring of an example MEMS device, according to some non-limiting embodiments. As shown in FIG. 13C, the nested spring 116 having the characteristics described herein is coupled to a component 1304 of a MEMS device. The nested spring 116 may be coupled to any suitable component 1304 of a MEMS device (e.g., a shuttle, as described herein, a proof mass, etc.). In some embodiments, the component 1304 may comprise a moving body, and in particular, a component which experiences large deformations relative to motion of other components of the MEMS device.

Example MEMS Devices

The aspects of the technology described herein may be implemented in a MEMS gyroscope (e.g., a MEMS gyroscope configured to sense roll, pitch, and/or yaw rotation. In some embodiments, the MEMS device 100 may form a portion of a larger MEMS device (e.g., a MEMS device having two or more proof masses). FIG. 14 illustrates an example MEMS gyroscope having four proof masses (e.g., a quad mass gyroscope), according to some non-limiting embodiments. In some embodiments, the MEMS gyroscope of FIG. 14 may be configured to sense rotation about two or more axes. FIG. 14 illustrates an example of a MEMS gyroscope 1400 having four quadrants 1404 coupled together and arranged in a 2×2 formation (e.g., an array). Each quadrant 1404 of the MEMS gyroscope of FIG. 14 may have a proof mass 1402. In some embodiments, the proof masses 1402 of the MEMS gyroscope 1402 are coupled together. Each quadrant of the MEMS gyroscope of FIG. 14 may have a proof mass comprising aspects of the technology described herein (e.g., attenuated motion, quadrature trim electrodes, pivoting linkages for increased linearity, nested springs).

The proof masses 1402 in the respective quadrants may be configured to move anti-phase relative to an adjacent proof mass 1402. That is, a proof mass 1402 may be configured to move in an opposite direction along a first axis in a drive mode relative to the motion of proof masses vertically and horizontally adjacent to the proof mass 1402, and in a same direction along the first axis relative to motion of a proof mass diagonally adjacent to the proof mass 1402. In a sense mode, the proof mass 1402 may be configured to move in an opposite direction along a second axis substantially perpendicular to the first axis relative to motion of the proof masses vertically and horizontally adjacent to the proof mass 1402, and in a same direction along the second axis relative to the motion of a proof mass diagonally adjacent to the proof mass 1402.

MEMS devices having aspects of the technology described herein may be deployed in various settings to detect angular rates, including sports, healthcare, military, and industrial applications, among others. A MEMS device (e.g., a MEMS inertial sensor such as a MEMS gyroscope, for example) may be mounted as a wearable sensor deployed in monitoring sports-related physical activity and performance, patient health, military personnel activity, or other applications of interest of a user. A MEMS gyroscope may be disposed in a smartphone, and may be configured to sense roll, pitch and/or yaw angular rates.

Figure 15:
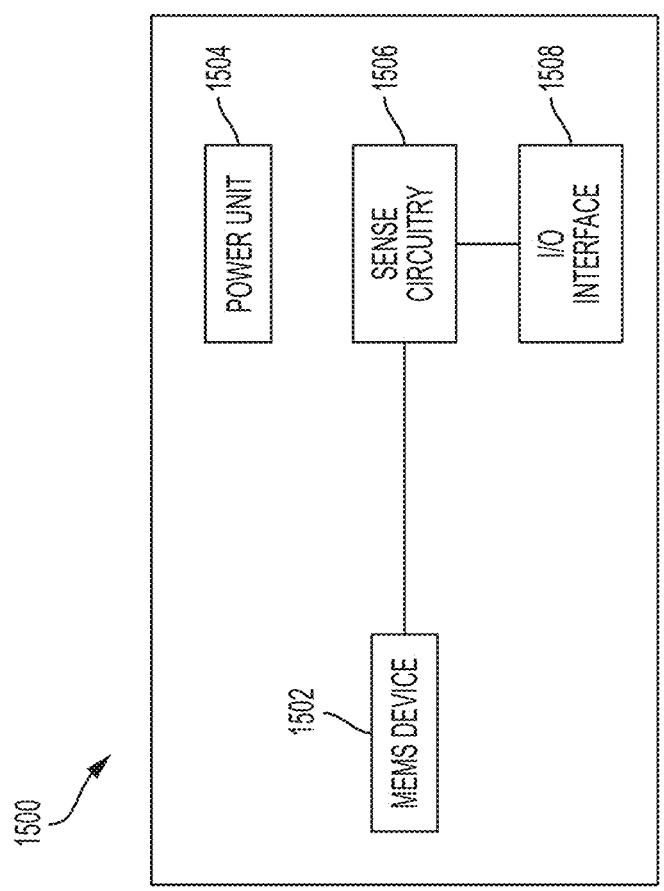
FIG. 15 is a block diagram illustrating an example system including a MEMS gyroscope, according to some non-limiting embodiments.

FIG. 15 is a block diagram illustrating a system 1500 comprising a MEMS device 1502, a power unit 1504, sense circuitry 1506 and input/output (I/O) interface 1508. MEMS device 1502 may comprise any one or a combination of the MEMS devices described herein. In some embodiments, the MEMS device(s) may comprise a MEMS gyroscope configured to sense roll, pitch and/or yaw angular rates.

System 1500 may periodically transmit, via wired connections or wirelessly, data representing sensed angular rates to an external monitoring system, such as a computer, a smartphone, a tablet, a smartwatch, smartglasses, or any other suitable receiving device. I/O interface 1508 may be configured to transmit and/or receive data via Wi-Fi, Bluetooth, Bluetooth Low Energy (BLE), Zigbee, Thread, ANT, ANT+, IEEE 802.15.4, IEEE 802.15.ah, or any other suitable wireless communication protocol. Alternatively, or additionally, I/O interface 1508 may be configured to transmit and/or receive data using proprietary connectivity protocols. I/O interface 1508 may comprise one or more antennas, such as a microstrip antenna. In some embodiments, I/O interface 1508 may be connected to a cable, and may be configured to transmit and/or receive signals through the cable.

System 1500 may be powered using power unit 1504. Power unit 1504 may be configured to power some or all of sense circuitry 1506, I/O interface 1508, and/or MEMS device 1502. In some embodiments, power unit 1504 may comprise one or more batteries. System 1500 may, in at least some embodiments, consume sufficiently little power to allow for its operation for extended periods based solely on battery power. The battery or batteries may be rechargeable in some embodiments. Power unit 1504 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 1504 may comprise circuitry to convert AC power to DC power. For example, power unit 1504 may receive AC power from a power source external to system 1500, such as via I/O interface 1508, and may provide DC power to some or all the components of system 1500. In such instances, power unit 1504 may comprise a rectifier, a voltage regulator, a DC-DC converter, or any other suitable apparatus for power conversion.

Power unit 1504 may comprise energy harvesting components and/or energy storage components, in some embodiments. Energy may be harvested from the surrounding environment and stored for powering the system 1500 when needed, which may include periodic, random, or continuous powering. The type of energy harvesting components implemented may be selected based on the anticipated environment of the system 1500, for example based on the expected magnitude and frequency of motion the system 1500 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

Figure 16:
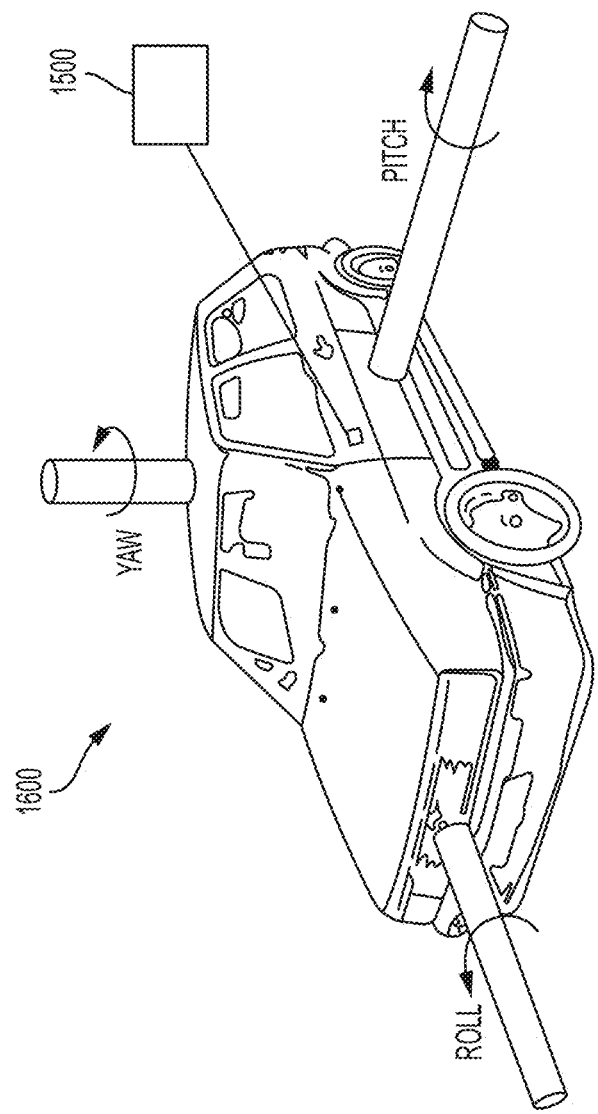
FIG. 16 is a perspective view illustrating an automobile including an example system having a MEMS gyroscope, according to some non-limiting embodiments.

As described above, MEMS devices of the types described herein may be deployed in various settings, for example, to detect angular rates. One such setting is in automobiles, or other vehicles, such as boats or aircrafts. FIG. 16 illustrates schematically an automobile 1600 comprising a system 1500, according to some non-limiting embodiments. System 1500 may be disposed in any suitable location of automobile 1500. In some embodiments, the system 1500 may comprise a package or housing attached to a suitable part of the automobile 1600, with the MEMS device inside. In some embodiments, system 1500 may be configured to sense roll, pitch and/or yaw angular rates. System 1500 may be configured to provide, using I/O interface 1508, sensed angular rates to a computer system disposed in automobile 1600 and/or to a computer system disposed on a base station outside automobile 1600.

Another setting in which MEMS devices having couplers of the types described herein may be used is in sensor devices for sports applications, such as tennis, swimming, running, baseball, or hockey, among other possibilities. In some embodiments, a MEMS device of the types described herein may be a wearable fitness device. In other embodiments, the sensor may be part of a piece of sporting equipment, such as being part of a tennis racket, baseball bat, or hockey stick. Sense data from the sensor may be used to assess performance of the user.

ALTERNATIVES AND SCOPE

Aspects of the technology described herein may provide one or more benefits, some of which have been previously described. It should be appreciated that not all aspects and embodiments necessarily provide all of the benefits described herein. Further, it should be appreciated that aspects of the technology described herein may provide additional benefits to those described herein.

The expressions "substantially in a direction" and "substantially parallel to a direction" should be interpreted herein as parallel to the direction or angled with respect to the direction by less than 20% including any value within that range.

The terms "approximately" and "about" may be used to mean ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A microelectromechanical systems (MEMS) device, comprising:
    a substrate;
    a proof mass coupled to the substrate and configured to move along a resonator axis, the proof mass comprising a plurality of openings;
    a first shuttle comprising one of a drive structure or a sense structure, wherein:
        the drive structure comprises a plurality of electrodes configured to drive the proof mass along the resonator axis; and
        the sense structure is configured to move along a second axis substantially perpendicular to the resonator axis in response to motion of the proof mass along the resonator axis and comprises a second plurality of electrodes configured to detect the motion of the proof mass; and
    a third plurality of electrodes disposed in the plurality of openings of the proof mass, wherein the plurality of openings are sized such that the drive structure can drive the proof mass along the second axis perpendicular to the resonator axis.

2. The MEMS device of claim 1, wherein the first shuttle comprises the drive structure.

3. The MEMS device of claim 2, further comprising a second shuttle comprising the sense structure.

4. The MEMS device of claim 1, further comprising a first lever coupled to the first shuttle at a first end of the first lever and to the proof mass at a second end of the first lever; and
    wherein the first lever is coupled to an anchor of the MEMS device at a pivot point a first distance away from the first end of the first lever and a second distance away from the second end of the first lever, and wherein the first distance is greater than the second distance such that displacement of the proof mass is attenuated relative to displacement of the first shuttle.

5. The MEMS device of claim 3, further comprising:
    a first lever coupled to the first shuttle at a first end of the first lever and to the proof mass at a second end of the first lever, wherein the first lever is coupled to an anchor of the MEMS device at a pivot point a first distance away from the first end of the first lever and a second distance away from the second end of the first lever, and wherein the first distance is greater than the second distance such that displacement of the proof mass is attenuated relative to displacement of the first shuttle; and
    a second lever coupled to the second shuttle at a first end of the second lever and to the proof mass at a second end of the second lever, wherein the second lever is coupled to a second anchor of the MEMS device at a second pivot point the first distance away from the first end of the second lever and the second distance away from the second end of the second lever such that displacement of the proof mass is attenuated relative to displacement of the second shuttle.

6. The MEMS device of claim 1, wherein:
    the drive structure is further configured to drive the drive structure along the second axis; and
    the sense structure is further configured to detect motion of the proof mass along the resonator axis.

7. The MEMS device of claim 1, wherein respective openings of the plurality of openings are non-rectangular.

8. The MEMS device of claim 1, wherein respective openings of the plurality of openings exhibit rotational symmetry.

9. The MEMS device of claim 1, wherein respective openings of the plurality of openings are shaped such that a maximum dimension between a respective electrode of the third plurality of electrodes and the proof mass along the resonator axis is equal to a maximum dimension between the respective electrode and the proof mass along the second axis perpendicular to the resonator axis.

10. The MEMS device of claim 1, wherein respective openings of the plurality of openings are shaped such that a minimum dimension between a respective electrode of the second plurality of electrodes and the proof mass along the resonator axis is equal to a minimum dimension between the respective electrode and the proof mass along the second axis perpendicular to the resonator axis.

11. The MEMS device of claim 1, wherein the third plurality of electrodes are disposed in respective openings of the plurality of openings in pairs.

12. A microelectromechanical systems (MEMS) device, comprising:
    a substrate;
    a proof mass coupled to the substrate and configured to move along a resonator axis, the proof mass comprising a plurality of openings;
    a drive structure comprising a plurality of electrodes and configured to drive the proof mass along the resonator axis; and
    a second plurality of electrodes disposed in the plurality of openings of the proof mass; wherein:
        respective openings of the plurality of openings are sized such that a maximum dimension between a respective electrode of the second plurality of electrodes and the proof mass along the resonator axis is equal to a maximum dimension between the respective electrode and the proof mass along a second axis perpendicular to the resonator axis.

13. The MEMS device of claim 12, wherein the respective openings of the plurality of openings are non-rectangular.

14. The MEMS device of claim 12, wherein the respective openings of the plurality of openings exhibit rotational symmetry.

15. The MEMS device of claim 12, further comprising:
    an anchor coupled to the substrate; and
    a nested spring coupling the drive structure to the anchor, wherein the nested spring exhibits bilateral symmetry.

16. The MEMS device of claim 15, wherein the nested spring comprises a plurality of folded portions extending outward from a center of the nested spring.

17. A gyroscope, comprising:
    a first proof mass coupled to an underlying substrate and configured to move along a resonator axis;

a drive structure comprising a first plurality of electrodes and configured to drive the first proof mass along the resonator axis;

a sense structure comprising a second plurality of electrodes and configured to move along a second axis perpendicular to the resonator axis;

and wherein the gyroscope is isotropic such that the resonator axis and the second axis may be switched such that when the resonator axis and the second axis are switched, the drive structure is configured to drive the first proof mass along the second axis perpendicular to the resonator axis and the sense structure is configured to move along the resonator axis.

18. The gyroscope of claim 17, further comprising:
a second proof mass;
a third proof mass; and
a fourth proof mass, wherein:
   surfaces of the first proof mass, the second proof mass, the third proof mass, and the fourth proof mass are polygonal; and
   the first proof mass, the second proof mass, the third proof mass, and the fourth proof mass are coupled to each other and arranged in a two by two array.

19. The gyroscope of claim 17, further comprising a first lever coupled to the drive structure at a first end of the first lever and to the first proof mass at a second end of the first lever; and
   wherein the first lever is coupled to an anchor of the gyroscope at a pivot point a first distance away from the first end of the first lever and a second distance away from the second end of the first lever, and wherein the first distance is greater than the second distance such that displacement of the first proof mass is attenuated relative to displacement of the drive structure.

20. The gyroscope of claim 17, further comprising:
a second anchor coupled to the underlying substrate; and
a nested spring coupling the drive structure to the second anchor, wherein the nested spring exhibits bilateral symmetry and each half of the nested spring comprises a plurality of folded portions.

* * * * *